(12) United States Patent
Oba et al.

(10) Patent No.: US 8,738,209 B2
(45) Date of Patent: May 27, 2014

(54) CONTROL DEVICE OF VEHICLE DRIVE APPARATUS

(75) Inventors: Mitsuru Oba, Anjo (JP); Yoshisuke Kametani, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 13/522,145

(22) PCT Filed: Jan. 30, 2010

(86) PCT No.: PCT/JP2010/051296
§ 371 (c)(1),
(2), (4) Date: Jul. 13, 2012

(87) PCT Pub. No.: WO2011/092858
PCT Pub. Date: Aug. 4, 2011

(65) Prior Publication Data
US 2012/0303199 A1    Nov. 29, 2012

(51) Int. Cl.
*B60K 1/02* (2006.01)
*B60L 11/00* (2006.01)
*G05D 1/00* (2006.01)

(52) U.S. Cl.
USPC .... 701/22; 701/70; 701/84; 477/3; 180/65.25

(58) Field of Classification Search
USPC .................. 701/22, 70, 84; 180/65.25; 477/3
See application file for complete search history.

(56) References Cited

U.S. PATENT DOCUMENTS

| | | | |
|---|---|---|---|
| 6,549,840 B1* | 4/2003 | Mikami et al. | 701/69 |
| 2002/0116100 A1* | 8/2002 | Shimazaki et al. | 701/22 |
| 2009/0141447 A1* | 6/2009 | Soma et al. | 361/694 |
| 2010/0004809 A1* | 1/2010 | Itoh | 701/22 |
| 2010/0030415 A1* | 2/2010 | Tang | 701/22 |
| 2010/0076637 A1* | 3/2010 | Ueoka | 701/22 |
| 2010/0248893 A1* | 9/2010 | Shimanaka | 477/5 |

FOREIGN PATENT DOCUMENTS

| | | |
|---|---|---|
| JP | A-2002-247704 | 8/2002 |
| JP | A-2005-59851 | 3/2005 |
| JP | A-2005-151766 | 6/2005 |
| JP | A-2007-159354 | 6/2007 |
| JP | A-2008-167540 | 7/2008 |

OTHER PUBLICATIONS

International Search Report issued in International Patent Application No. PCT/JP2010/051296 dated Apr. 20, 2010.

* cited by examiner

*Primary Examiner* — Fadey Jabr
*Assistant Examiner* — Thomas Ingram
(74) *Attorney, Agent, or Firm* — Oliff PLC

(57) ABSTRACT

It is provided a control device of a vehicle drive apparatus in a vehicle including an electric motor for driving drive wheels, the control device controlling an output torque of the electric motor in accordance with a predetermined electric motor torque control characteristic making the output torque of the electric motor larger when a requested drive force is greater such that a drive force of the vehicle becomes equal to the requested drive force requested by a driver, wherein when the stopped vehicle is started, if the requested drive force is equal to or less than a requested drive force judgment value set equal to or less than a necessary start-up drive force necessary for start-up of the vehicle, the control device provides electric motor torque suppression control suppressing the output torque of the electric motor below an output torque determined from the electric motor torque control characteristic.

19 Claims, 9 Drawing Sheets

|  | B1 | B2 |
|---|---|---|
| LOW-SPEED STAGE Lo (FIRST SPEED) | × | ○ |
| HIGH-SPEED STAGE Hi (SECOND SPEED) | ○ | × |

○ : ENGAGEMENT OF BRAKE
× : RELEASE OF BRAKE

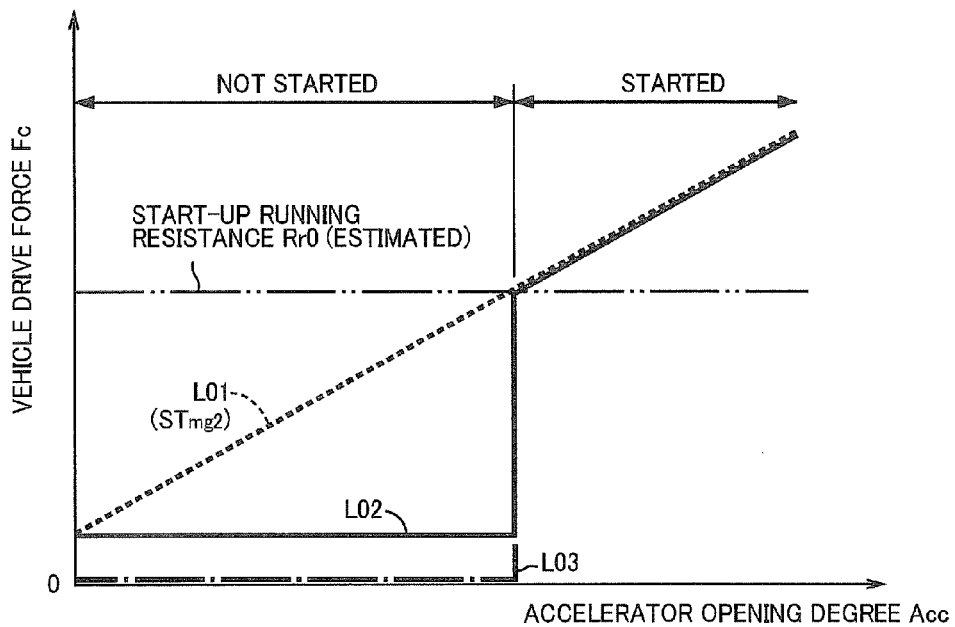
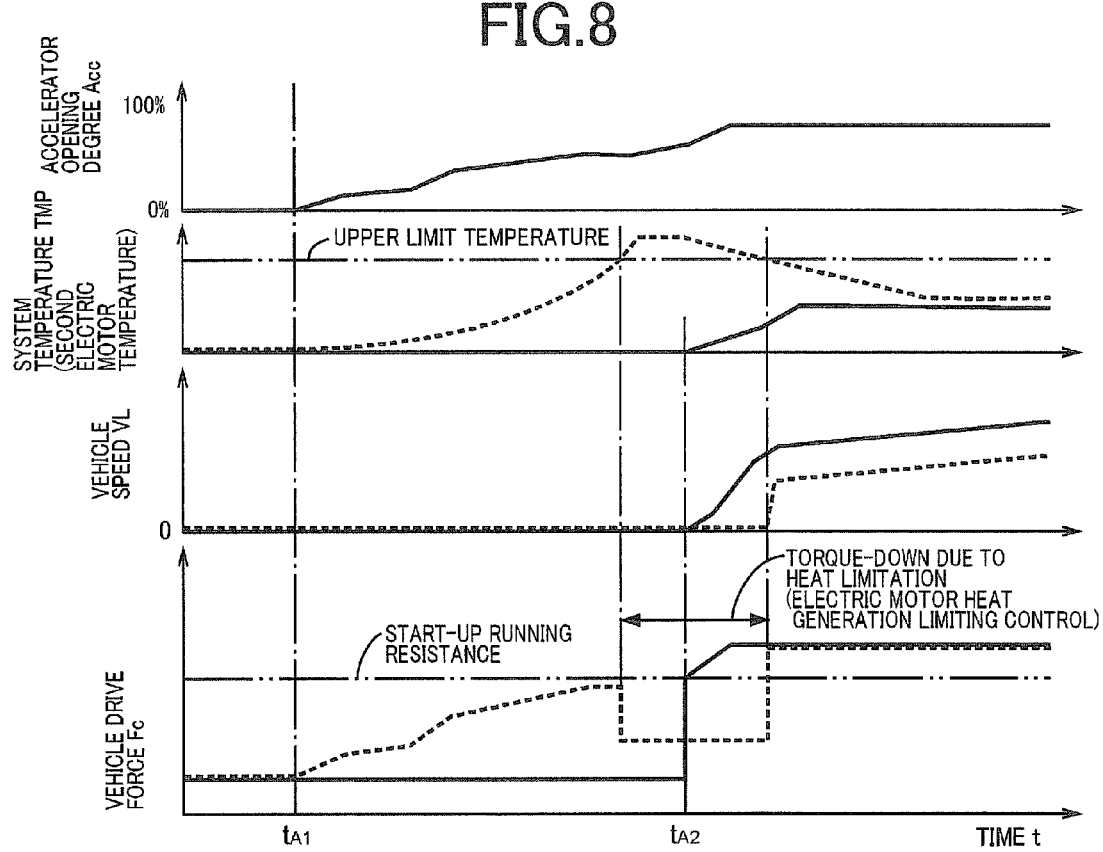

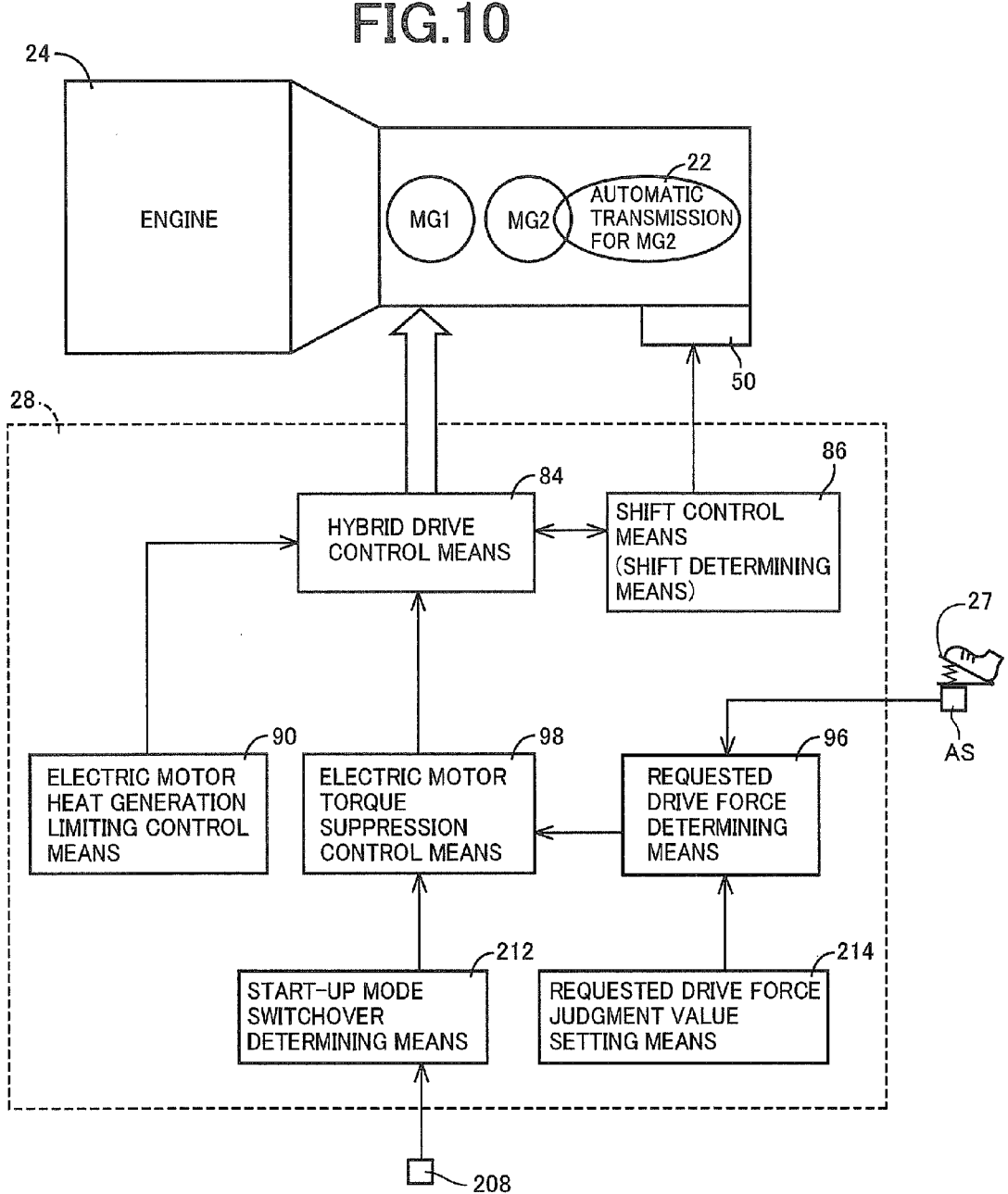

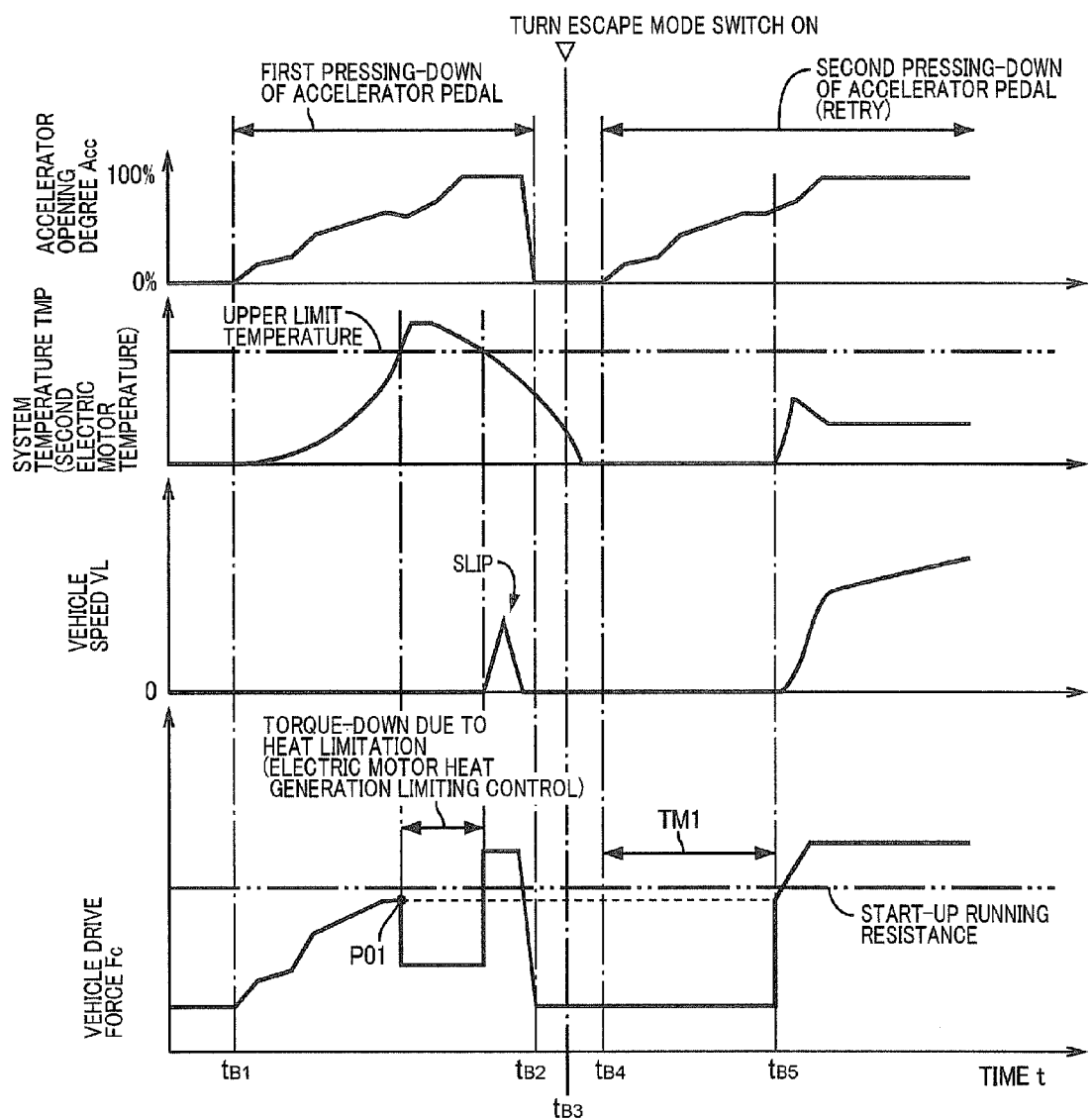

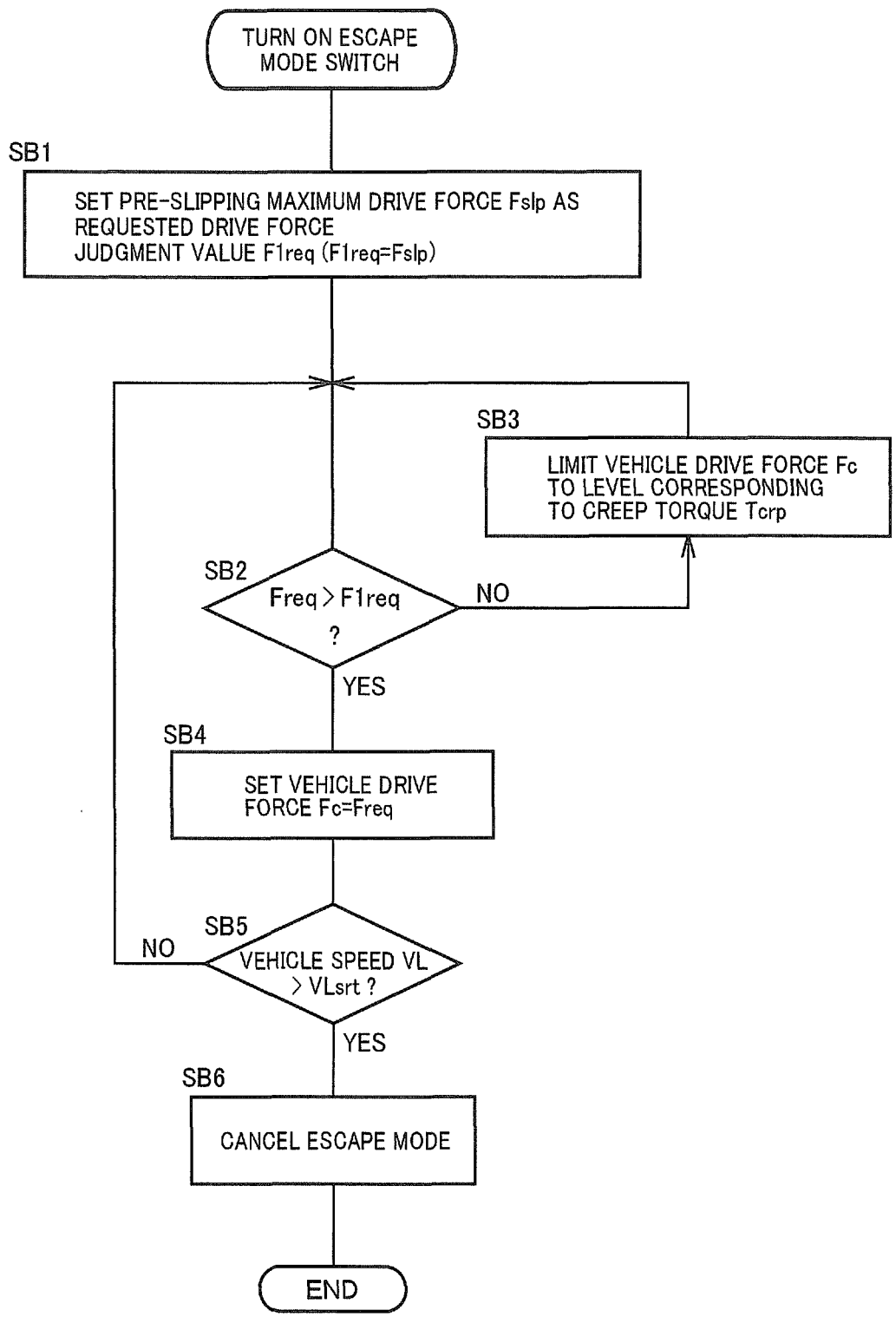

CONTROL DEVICE OF VEHICLE DRIVE APPARATUS

TECHNICAL FIELD

The present invention relates to a technique of controlling a drive force at vehicle start-up in a vehicle having an electric motor as a drive force source.

BACKGROUND ART

A vehicle drive apparatus including an electric motor as a drive force source is well known, as in the case of a hybrid car and an electric automobile. For example, this corresponds to a vehicle drive apparatus of Patent Document 1.

The vehicle drive apparat us of Patent Document 1 includes an engine and a front-wheel electric motor driving front wheels, and a rear-wheel electric motor driving rear wheels. A control device of the vehicle drive apparatus basically uses only the front-wheel electric motor and the rear-wheel electric motor (simply referred to as "electric motors" if not distinguished) to drive the wheels without operating the engine at vehicle start-up.

PRIOR ART DOCUMENT

Patent Document

Patent Document 1: Japanese Laid-Open Patent Publication No. 2005-59851

SUMMARY OF THE INVENTION

Problem to be Solved by the Invention

When a vehicle drive force is increased so as to start a vehicle, the stopped vehicle does not start running immediately after the vehicle drive force becomes greater than zero and starts running when the vehicle drive force exceeds running resistance at start-up. Therefore, the control device of the vehicle drive apparatus of Patent Document 1 only uses electric motors to drive wheels at vehicle start-up as described above; however, if the vehicle drive force generated by the electric motors is equal to or less than the running resistance, it is problematic that the electric motors wastefully consume energy (electric power) and generate heat although the vehicle is still stopped. Such a problem is not known.

The present invention was conceived in view of the situations and it is therefore an object of the present invention to provide a control device of a vehicle drive apparatus capable of suppressing an energy loss and wasteful heat generation of an electric motor at vehicle start-up in the vehicle drive apparatus including the electric motor as a drive force source.

Means for Solving the Problems

To achieve the object, the first aspect of the present invention provides (a) a control device of a vehicle drive apparatus in a vehicle including an electric motor for driving drive wheels, the control device controlling an output torque of the electric motor in accordance with a predetermined electric motor torque control characteristic making the output torque of the electric motor larger when a requested drive force is greater such that a drive force of the vehicle becomes equal to the requested drive force requested by a driver, wherein (b) when the stopped vehicle is started, if the requested drive force is equal to or less than a requested drive force judgment value set equal to or less than a necessary start-up drive force necessary for start-up of the vehicle, the control device provides electric motor torque suppression control suppressing the output torque of the electric motor below an output torque determined from the electric motor torque control characteristic.

The Effects of the Invention

Consequently, even if the requested drive force is increased within a range in which the vehicle cannot be started, the electricity consumption of the electric motor is suppressed as compared to that in the case of following the electric motor torque control characteristic and, as a result, an energy loss and unnecessary heat generation of the electric motor can be suppressed at vehicle start-up.

Preferably, (a) the electric motor torque suppression control is provided if the requested drive force is once increased and decreased and then increased again during vehicle stop, and wherein (b) if the vehicle is still stopped after the requested drive force is once increased and decreased during vehicle stop, the requested drive force judgment value is set in advance to a drive force equal to or less than a maximum value of a drive force of the vehicle when the drive wheels do not rotate during the increase and decrease of the requested drive force. Consequently, the requested drive force judgment value can easily and appropriately be set.

Preferably, (a) if a temperature of the electric motor exceeds a predetermined upper limit temperature, the control device provides electric motor heat generation limiting control limiting the output torque of the electric motor equal to or less than a predetermined limit value, and wherein (b) if the drive wheels slip due to cancellation of the output torque limitation of the electric motor through the electric motor heat generation limiting control provided during the increase and decrease of the requested drive force, the requested drive force judgment value is set in advance to a drive force equal to or less than the drive force of the vehicle at the start of the output torque limitation of the electric motor through the electric motor heat generation limiting control. Consequently, the durability of the electric motor can be restrained from being damaged due to heat generation, and the drive wheels can be restrained from repeatedly slipping due to the output torque limitation of the electric motor through the electric motor heat generation limiting control at vehicle start-up.

Preferably, the electric motor torque suppression control is provided if a start-up mode selected at start-up of the vehicle is selected. Consequently, the electric motor torque suppression control can be provided, for example, in accordance with the intention of a driver selecting the start-up mode at vehicle start-up.

Preferably, in the electric motor torque suppression control, the output torque of the electric motor is suppressed to generate a creep torque when an accelerator opening degree is zero. Consequently, the state same as the stopped vehicle state is easily maintained before start-up of the vehicle.

Preferably, if the output torque of the electric motor is suppressed through the electric motor torque suppression control, the output torque of the electric motor is set to zero. Consequently, an energy loss and unnecessary heat generation of the electric motor can considerably be restrained at vehicle start-up as compared to those when the output torque of the electric motor is not set to zero.

Preferably, (a) the necessary start-up drive force is estimated based on a running state before stop of the vehicle, and wherein (b) the requested drive force judgment value is set in advance to the estimated necessary start-up drive force. Consequently, the requested drive force judgment value can be set even if the requested drive force is not increased and decreased once during vehicle stop.

Also, (a) a control device of a vehicle drive apparatus in a vehicle including an electric motor for driving drive wheels, the control device controlling an output torque of the electric motor in accordance with a predetermined electric motor torque control characteristic making the output torque of the electric motor larger when a requested drive force is greater such that a drive force of the vehicle becomes equal to the requested drive force requested by a driver, wherein (b) when the stopped vehicle is started, if the requested drive force exceeds a requested drive force judgment value set equal to or less than a necessary start-up drive force necessary for start-up of the vehicle, the control device controls the output torque of the electric motor in accordance with the electric motor torque control characteristic. Consequently, an energy loss and unnecessary heat generation of the electric motor can be suppressed at vehicle start-up as well as the invention recited in the first aspect of the present invention.

Preferably, the requested drive force judgment value is set to be larger when the necessary start-up drive force is greater. Consequently, an energy loss and unnecessary heat generation of the electric motor can appropriately be suppressed at vehicle start-up depending on a change in the necessary start-up drive force.

Although both the first and eighth aspects of the invention are independent claims, the both claims are described by using expressions different from each other so as to protect the invention in a multifaceted manner and, therefore, the aspects of the invention according to the both claims have the same special technical features and these aspects of the invention are linked such that a single general inventive concept is formed.

BRIEF DESCRIPTION OF THE DRAWINGS

FIG. 7 is a diagram for explaining the electric motor torque suppression control provided by the electric motor toque suppression control means of FIG. 4.

FIG. 8 is a time chart in the first embodiment for explaining the suppression of the vehicle drive force (the second electric motor torque) through the electric motor torque suppression control when the start-up of the vehicle is taking as an example in the vehicle drive apparatus of FIG. 1.

FIG. 10 is a functional block diagram in the second embodiment for explaining a main portion of the control function of the electronic control device of FIG. 1, and is a diagram corresponding to FIG. 4 in the first embodiment.

FIG. 11 is a time chart in the second embodiment for explaining the setting of the requested drive force judgment value and the suppression of the vehicle drive force (the second electric motor torque) through the electric motor torque suppression control, by way of example, if the electric motor heat generation limiting control is provided at start-up of the vehicle of FIG. 1 when the accelerator opening degree is increased and decreased during vehicle stop and the opening degree is subsequently increased again, causing the vehicle to start, and is a diagram corresponding to FIG. 8 in the first embodiment.

FIG. 12 is a flowchart in the second embodiment for explaining a main portion of the control operation of the electronic control device of FIG. 10, i.e., control of the vehicle drive force Fc at vehicle start-up, and is a diagram corresponding to FIG. 9 in the first embodiment.

MODES FOR CARRYING OUT THE INVENTION

Embodiments of the present invention will now be described in detail with reference to the drawings.

First Embodiment

Figure 1:
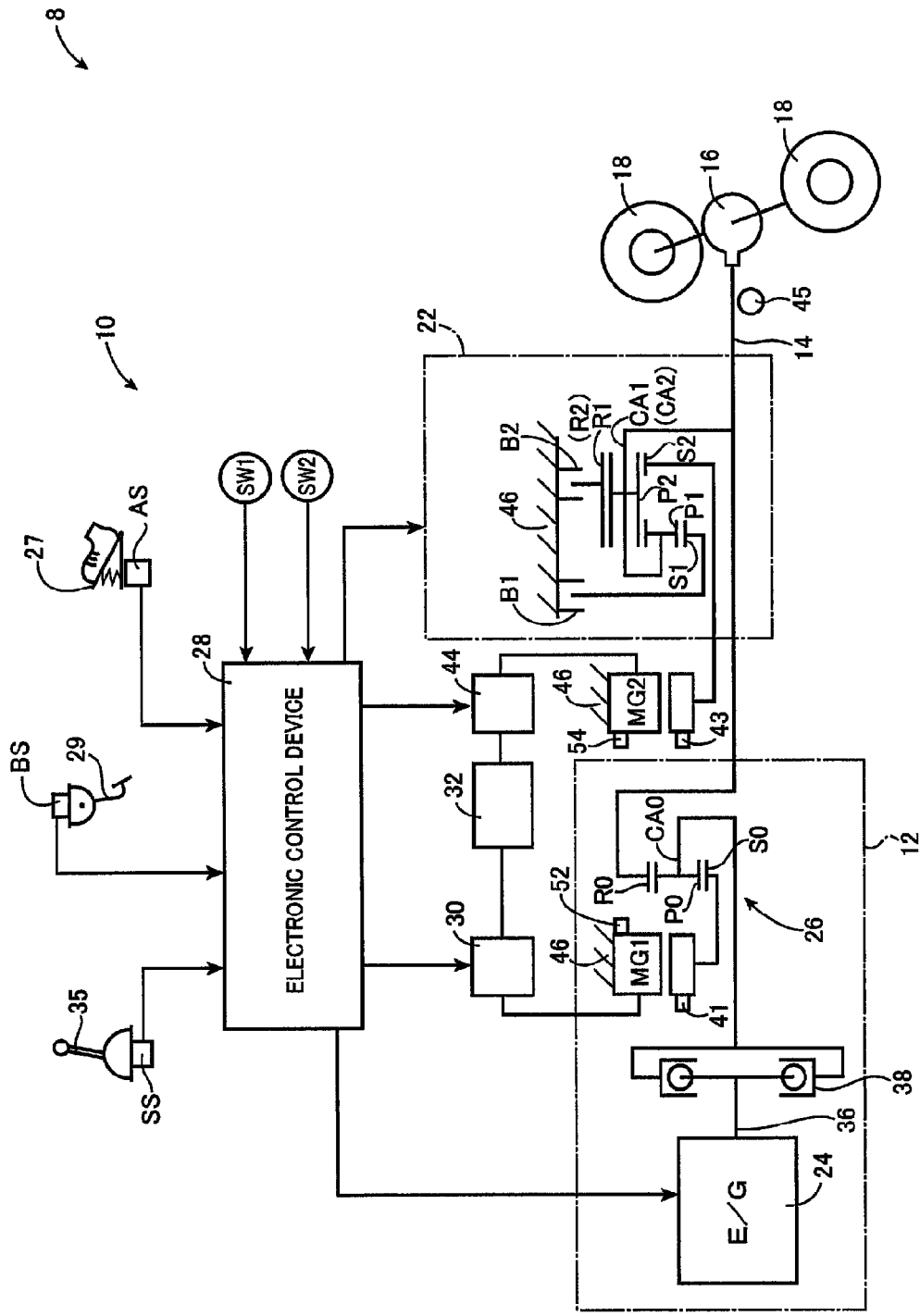
FIG. 1 is a diagram of a general configuration for explaining a vehicle drive apparatus to which the present invention is applied.

FIG. 1 is a diagram of a general configuration for explaining a vehicle drive apparatus 10 used for a hybrid vehicle 8 (hereinafter referred to as a "vehicle 8") to which the present invention is applied. In FIG. 1, the vehicle drive apparatus 10 includes a first drive source 12 that is a main drive source, a wheel-side output shaft 14 (hereinafter referred to as an "output shaft 14") acting as an output member, a differential gear device 16, a second electric motor MG2, and an automatic transmission 22. In the vehicle 8, the vehicle drive apparatus 10 transmits a torque of the first drive source 12 to the output shaft 14 and then transmits the torque from the output shaft 14 via the differential gear device 16 to a pair of left and right drive wheels 18. The vehicle drive apparatus 10 has the second electric motor MG2 capable of selectively providing power running control for outputting a drive force for running and regenerative control for recovering energy and the second electric motor MG2 is coupled via the automatic transmission 22 to the output shaft 14 in a power transmittable manner. Therefore, the output torque transmitted from the second electric motor MG2 to the output shaft 14 is increased and decreased depending on a gear ratio γs (=rotation speed Nmg2 of the second electric motor MG2/rotation speed Nout of the output shaft 14) set by the automatic transmission 22.

The automatic transmission 22 making up a portion of a power transmission path between the second electric motor MG2 (corresponding to an electric motor of the present invention) and the output shaft 14 (the drive wheels 18) is configured such that a plurality of stages having the gear ratio γs greater than "1" can be established; at the time of power running when a torque is output from the second electric motor MG2, the torque can be increased and transmitted to the output shaft 14; and, therefore, the second electric motor MG2 is configured with a lower capacity or in a smaller size. As a result, if the rotation speed Nout of the output shaft 14 (referred to as an "output shaft rotation speed Nout") is increased, for example, in association with a higher vehicle speed, the rotation speed (hereinafter referred to as a second electric motor rotation speed) Nmg2 of the second electric motor MG2 is reduced by making the gear ratio γs smaller so as to maintain the operation efficiency of the second electric motor MG2 in a favorable state, or if the output shaft rotation speed Nout is reduced, the gear ratio γs is made large to increase the second electric motor rotation speed Nmg2.

The first drive source 12 is mainly made up of an engine 24 acting as a main power source, a first electric motor MG1, and a planetary gear device 26 acting as a power distribution mechanism (differential mechanism) for combining or distributing torque between the engine 24 and the first electric motor MG1. The engine 24 is a known internal combustion engine that combusts fuel to output power, such as a gasoline engine and a diesel engine, and is configured to have an operational state, such as a throttle valve opening degree and an intake air amount, a fuel supply amount, and an ignition timing, electrically controlled by an electronic control device 28 mainly made up of a microcomputer and having functions as an engine-control electronic control unit (E-ECU).

The first electric motor MG1 is, for example, a synchronous electric motor, configured to selectively fulfill a function as an electric motor generating a drive torque and a function as an electric generator, and connected via a first inverter 30 to an electric storage device 32. The electronic control device 28 also has a function as a motor-generator-control electronic control unit (MG-ECU) and the first inverter 30 is controlled by the electronic control device 28 to adjust or set the output torque or the regenerative torque of the first electric motor MG1.

The planetary gear device 26 is a single pinion type planetary gear mechanism that includes a sun gear S0, a ring gear R0 disposed concentrically to the sun gear S0, and a carrier CA0 supporting a pinion gear P0 engaging with the sun gear S0 and the ring gear R0 in a rotatable and revolvable manner as three rotating elements to generate a known differential action. The planetary gear device 26 is disposed concentrically to the engine 24 and the automatic transmission 22. Since the planetary gear device 26 and the automatic transmission 22 are symmetrically configured relative to a center line, the lower halves thereof are not depicted in FIG. 1.

In this embodiment, a crankshaft 36 of the engine 24 is coupled via a damper 38 to the carrier CA0 of the planetary gear device 26. On the other hand, the sun gear S0 is coupled to the first electric motor MG1, and the ring gear R0 is coupled to the output shaft 14. The carrier CA0 acts as an input element; the sun gear S0 acts as a reaction force element; and the ring gear R0 acts as an output element.

Figures 2, 3:
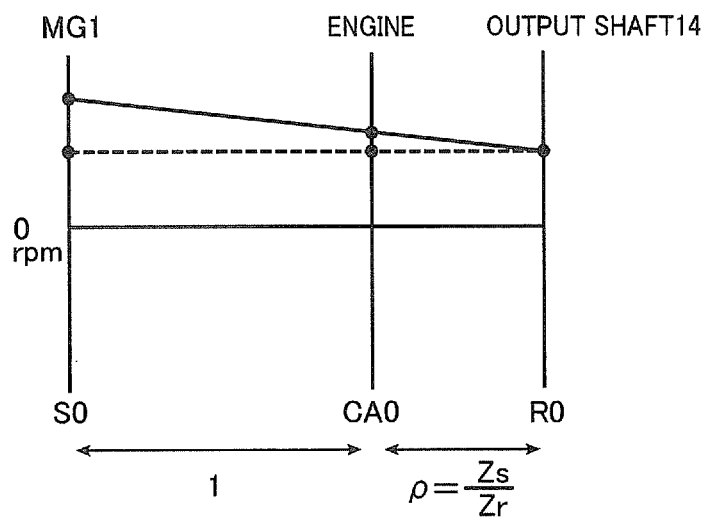
FIG. 2 is a collinear diagram depicting relative relationship among rotation speeds of the rotating elements in the planetary gear device acting as a power distribution mechanism in the vehicle drive apparatus of FIG. 1.
FIG. 3 is an engagement operation table of the automatic transmission provided in the vehicle drive apparatus of FIG. 1.

A collinear diagram of FIG. 2 depicts relative relationship among rotation speeds of the rotating elements in the single pinion type planetary gear device 26 acting as a differential mechanism. In this collinear diagram, a vertical axis S0, a vertical axis CA0, and a vertical axis R0 are axes representative of a rotation speed of the sun gear S0, a rotation speed of the carrier CA0, and a rotation speed of the ring gear R0, respectively, and mutual intervals between the vertical axis S0, the vertical axis CA0, and the vertical axis R0 are set such that an interval between the vertical axis CA0 and the vertical axis R0 is ρ (teeth number Zs of the sun gear S0/teeth number Zr of the ring gear R0) when an interval between the vertical axis S0 and the vertical axis CA0 is set to one.

If a reaction torque from the first electric motor MG1 is input to the sun gear S0 for an output torque of the engine 24 input to the carrier CA0 in the planetary gear device 26, a direct torque occurs in the ring gear R0 that is the output element and, therefore, the first electric motor MG1 acts as an electric generator. When the rotation speed of the ring gear R0, i.e., the output shaft rotation speed Nout is constant, a rotation speed Ne of the engine 24 (hereinafter referred to as an "engine rotation speed Ne") can be changed continuously, i.e., in a stepless manner, by changing a rotation speed Nmg1 of the first electric motor MG1 (hereinafter referred to as a "first electric motor rotation speed Nmg1") higher and lower. A broken line of FIG. 2 indicates a reduced state of the engine rotation speed Ne when the first electric motor rotation speed Nmg1 is lowered from a value indicated by a solid line. That is, control of setting a rotation speed of the engine Ne for the optimum fuel consumption, for example, can be provided by controlling the first electric motor MG1. This kind of hybrid type is referred to as a mechanical distribution or split type. As described above, a differential state of the planetary gear device 26 is electrically controlled by the first electric motor MG1.

Returning to FIG. 1, the automatic transmission 22 is made up of a set of Ravigneaux type planetary gear mechanisms. In other words, the automatic transmission 22 is disposed with a first sun gear S1 and a second sun gear S2; a larger diameter portion of a stepped pinion P1 engages with the first sun gear S1; the stepped pinion P1 engages with a pinion P2; and the pinion P2 engages with a ring gear R1 (R2) disposed concentrically to the sun gears S1, S2. The pinions P1, P2 are held by a common carrier CA1 (CA2) in a rotatable and revolvable manner. The sun gear S2 engages with the pinion P2.

The second electric motor MG2 is controlled via a second inverter 44 by the electronic control device 28 acting as a motor-generator-control electronic control unit (MG-ECU) and is driven to act as an electric motor or an electric generator and the assist output torque or the regenerative torque is adjusted or set. The second sun gear S2 is coupled to the second electric motor MG2 and the carrier CA1 is coupled to the output shaft 14. The first sun gear S1 and the ring gear R1 make up a mechanism corresponding to a double pinion type planetary gear device along with the pinions P1 and P2 and the second sun gear S2 and the ring gear R1 make up a mechanism corresponding to a single pinion type planetary gear device along with the pinion P2.

The automatic transmission 22 is disposed with a first brake B1 disposed for selectively fixing the sun gear S1 between the sun gear S1 and a housing 46 that is a non-rotating member, and a second brake B2 disposed for selectively fixing the ring gear R1 between the ring gear R1 and the housing 46. The brakes B1, B2 are so-called friction engagement devices using a frictional force to generate a braking force and are implemented by employing multi-plate type engagement devices or band-type engagement devices. The brakes B1, B2 are configured such that torque capacities thereof are respectively continuously changed depending on engagement pressures generated by a hydraulic actuator for the brake B1 and a hydraulic actuator for the brake B2 such as hydraulic cylinders.

In the automatic transmission 22 configured as described above, the sun gear S2 acts as an input element and the carriers CA1 and CA2 act as output elements. As depicted in an engagement table of FIG. 3, the automatic transmission 22 is configured such that a high-speed stage Hi is established with a gear ratio γsh greater than "1" when the first brake B1 is engaged and the second brake B2 is released, while a low-speed stage Lo is established with a gear ratio γsl greater than the gear ratio γsh of the high-speed stage Hi when the second brake B2 is engaged and the firs brake B1 is released. In other words, the automatic transmission 22 is a two-speed stepped transmission in which a clutch-to-clutch shift is performed by releasing release-side engagement devices and engaging engagement-side engagement devices, and a shift between the gear stages Hi and Lo is performed based on a running state such as a vehicle speed VL and a requested drive force (or an accelerator opening degree Acc). More specifically, gear stage ranges are determined in advance as a map (shift diagram) and control is provided such that one of the gear stages is set depending on a detected operation state. The electronic control device 28 also acts as a transmission-control electronic control unit (T-ECU) for providing such shift control of the automatic transmission 22.

Since both the gear ratios γsl and γsh are greater than "1" as described above, while each of the gear stages Lo and Hi is steadily set, the torque added to the output shaft 14 is a torque acquired by increasing an output torque Tmg2 of the second electric motor MG2 in accordance with each of the gear ratios; however, while the automatic transmission 22 is in a shift transient state, the torque is affected by the torque capacities of the brakes B1, B2, an inertia torque associated with a change in rotation speed and the like. The torque added to the output shaft 14 is a positive torque while the second electric motor MG2 is in a driving state and is a negative torque while the second electric motor MG2 is in a driven state. The driven state of the second electric motor MG2 is a state in which the rotation of the output shaft 14 is transmitted via the automatic transmission 22 to the second electric motor MG2 to rotate and drive the second electric motor MG2, and the driven state does not necessarily consist with a driving or driven state of a vehicle.

As described above, the electronic control device 28 is configured to have, for example, functions as the engine-control electronic control unit (E-ECU) for controlling the engine 24, the MG-control electronic control unit (MG-ECU) for controlling the first electric motor MG1 and the second electric motor MG2, and the transmission-control electronic control unit (T-ECU) for controlling the automatic transmission 22. The electronic control device 28 is supplied with a signal indicative of the first electric motor rotation speed Nmg1 from a first electric motor rotation speed sensor 41 such as a resolver; a signal indicative of the second electric motor rotation speed Nmg2 from a second electric motor rotation speed sensor 43 such as a resolver; a signal indicative of the output shaft rotation speed Nout corresponding to the vehicle speed VL from an output shaft rotation speed sensor 45; a signal indicative of an oil pressure PB1 of the first brake B1 (hereinafter referred to as a "first brake oil pressure PB1") from an oil pressure switch signal SW1; a signal indicative of an oil pressure PB2 of the second brake B2 (hereinafter referred to as a "second brake oil pressure PB2") from an oil pressure switch SW2; a signal indicative of an operation position of a shift lever 35 from an operation position sensor SS; a signal indicative of an operation amount (accelerator opening degree Acc) of an accelerator pedal 27 from an accelerator operation amount sensor AS; a signal indicative of the presence of operation of a brake pedal 29 from a brake sensor BS; a signal indicative of a temperature of the first electric motor MG1 from a first electric motor temperature sensor 52 disposed on the first electric motor MG1; and a signal indicative of a temperature of the second electric motor MG2 from a second electric motor temperature sensor 54 disposed on the second electric motor MG2. Additionally, the electronic control device 28 is supplied from sensors etc., not depicted with a signal indicative of a charging current or discharging current (hereinafter referred to as charging/discharging current or input/output current) Icd of the electric storage device 32; a signal indicative of a voltage Vbat of the electric storage device 32; a signal indicative of a charge remaining amount (state of charge) SOC of the electric storage device 32; a signal indicative of a supply current (drive current) Img1 of the first inverter 30 to the first electric motor MG1 corresponding to an output torque Tmg1 (hereinafter referred to as a "first electric motor torque Tmg1") or a regenerative torque of the first electric motor MG1; a signal indicative of a supply current (drive current) Img2 of the second inverter 44 to the second electric motor MG2 corresponding to the output torque Tmg2 (hereinafter referred to as a "second electric motor torque Tmg2") or a regenerative torque of the second electric motor MG2; and a signal indicative of a weight m1 (vehicle weight m1) of the vehicle 8. Although the temperatures of the electric motors MG1 and MG2 are detected by the temperature sensors 52 and 54, the electric motors MG1 and MG2 are housed in the housing 46 along with the planetary gear device 26 and the automatic transmission 22 and cooled by the operating oil of the automatic transmission 22 in this embodiment and, therefore, the operating oil temperature may be detected as the temperatures of the electric motors MG1 and MG2.

Figure 4:
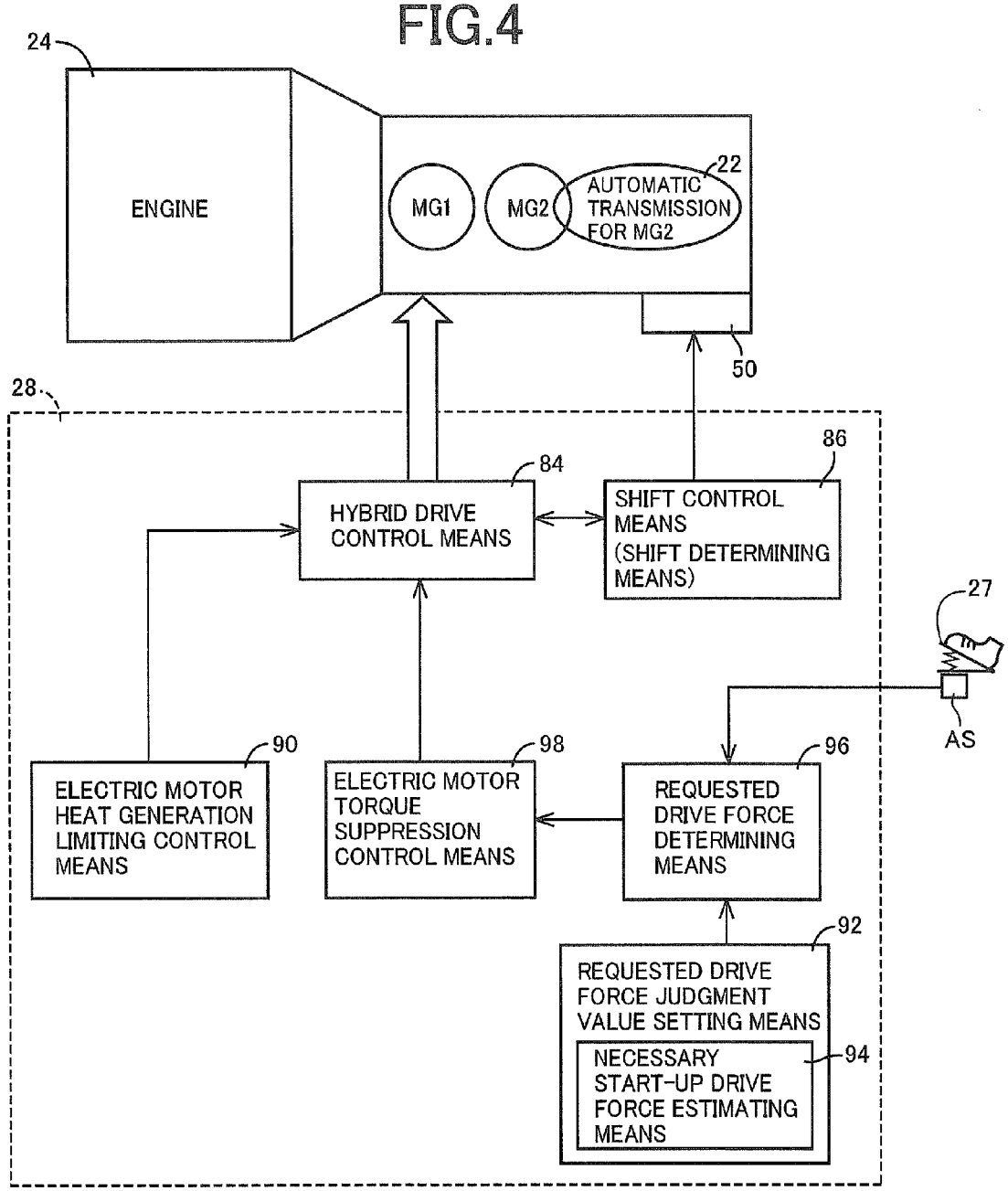
FIG. 4 is a functional block diagram in the first embodiment for explaining a main portion of the control function of the electronic control device of FIG. 1.

FIG. 4 is a functional block diagram for explaining a main portion of the control function of the electronic control device 28. As depicted in FIG. 4, the electronic control device 28 includes a hybrid drive control means 84, a shift control means 86, an electric motor heat generation limiting control means 90, a requested drive force judgment value setting means 92, a requested drive force determining means 96, and an electric motor torque suppression control means 98.

For example, after a key is inserted into a key slot, when a power switch is operated to activate the control while a brake pedal is operated, the hybrid drive control means 84 calculates a requested output of a driver based on an accelerator operation amount and drives the engine 24 and/or the second electric motor MG2 to generate the requested output such that the operation is achieved with lower fuel consumption and a smaller exhaust gas amount. For example, the hybrid drive control means 84 selectively switches a motor running mode using only the second electric motor MG2 as a drive source with the engine 24 stopped, a charging running mode using the second electric motor MG2 as a drive source while the first electric motor MG1 generates electric power from the power of the engine 24, an engine running mode mechanically transmitting the power of the engine 24 to the drive wheels 18, etc., depending on a running state.

The hybrid drive control means 84 controls the engine rotation speed Ne through the first electric motor MG1 such that the engine 24 operates on a predetermined operation curve such as an optimal fuel consumption curve, for example. When the second electric motor MG2 is driven for torque assist, the automatic transmission 22 is set to the low-speed stage Lo to increase the torque added to the output shaft 14 while the vehicle speed VL is slow, and the automatic transmission 22 is set to the high-speed stage Hi to relatively decrease the second electric motor rotation speed Nmg2 for reduction of loss while the vehicle speed VL is increased, thereby performing efficient torque assist. During coasting, the first electric motor MG1 or the second electric motor MG2 is rotationally driven by inertia energy of a vehicle to regenerate electric power, which is stored in the electric storage device 32.

Reverse running is achieved by rotationally driving the second electric motor MG2 in a reverse direction while the automatic transmission 22 is set to the low-speed stage Lo, for example. In this case, the first electric motor MG1 of the first drive source 12 is caused to idle and the output shaft 14 is allowed to rotate in reverse regardless of the operation state of the engine 24.

More Specifically describing the control in the engine running mode as an example, the hybrid drive control means 84 drives the engine 24 to operate in an efficient operation range while controlling the drive force distribution between the engine 24 and the second electric motor MG2 and the reaction force due to the electric generation by the first electric motor MG1 to achieve the optimum state for the sake of power performance, fuel consumption improvement, etc.

For example, the hybrid drive control means 84 determines a target drive force related value, for example, a requested output shaft torque TR (corresponding to a requested drive torque) from a drive force map stored in advance based on an accelerator operation amount, a vehicle speed, etc., calculates a requested output shaft power from the requested output shaft torque TR in consideration of a charge request value etc., calculates a target engine power so as to acquire the requested output shaft power in consideration of a transmission loss, loads of accessories, an assist torque of the second electric motor MG2, a gear stage of the automatic transmission 22, etc., and controls the engine 24 as well as an amount of the electric generation of the first electric motor MG1 to achieve the engine rotation speed and the engine torque at which the target engine power is acquired while operating the engine 24 along the optimal fuel consumption curve (fuel consumption map, relationship) of the engine empirically obtained and stored in advance so as to satisfy both the drivability and the fuel consumption property in the two-dimensional coordinates made up of the engine rotation speed and the engine torque, for example.

Since the hybrid drive control means 84 supplies the electric energy generated by the first electric motor MG1 via the inverters 30, 44 to the electric storage device 32 and the second electric motor MG2, a main portion of the power of the engine 24 is mechanically transmitted to the output shaft 14 while a portion of the power of the engine 24 is consumed for the electric generation of the first electric motor MG1 and converted into electric energy, and the electric energy is supplied via the inverters 30, 44 to the second electric motor MG2 to drive the second electric motor MG2 and is transmitted from the second electric motor MG2 to the output shaft 14. The devices related to the electric energy from the generation to the consumption by the second electric motor MG2 make up an electric path from the conversion of a portion of the power of the engine 24 into electric energy to the conversion of the electric energy into mechanical energy. The hybrid drive control means 84 can directly supply electric energy from the electric storage device 32 via the second inverter 44 to the second electric motor MG2 to drive the second electric motor MG2 in addition to the electric energy through the electric path.

The hybrid drive control means 84 can control the first electric motor MG1 with the differential action of the planetary gear device 26 to maintain or control the engine rotation speed substantially constant or at an arbitrary rotation speed regardless of whether a vehicle is stopped or running. In other words, the hybrid drive control means 84 can control the rotation of the first electric motor MG1 at an arbitrary rotation speed while maintaining or controlling the engine rotation speed substantially constant or at an arbitrary rotation speed.

The hybrid drive control means 84 functionally includes an engine output control means using commands separately or in a combined manner to control opening/closing of an electronic throttle valve with a throttle actuator for throttle control, to control a fuel injection amount and an injection timing of a fuel injection device for fuel injection control, and to control a timing of ignition by an ignition device such as an igniter for ignition timing control so as to provide the output control of the engine 24 such that the necessary engine output is generated.

If the hybrid drive control means 84 determines that the motor running mode using the second electric motor MG2 is switched to the engine running mode using the engine 24 based on, for example, a running mode switching map not depicted for switching a preset vehicle running mode, the hybrid drive control means 84 executes an engine starting process to start the engine 24. In the engine starting process, the rotation speed Ne of the engine 24 is electrically raised by utilizing the differential action of the planetary gear device 26 through the control of the first electric motor MG1 and the second electric motor MG2 and, when the engine rotation speed Ne is raised to a preset ignition-enabled rotation speed Nig, the engine 24 is started by providing the control of fuel injection by the fuel injection device and providing the control of timing of ignition by the ignition device. The running mode switching map is formed as a two-dimensional map consisting of the vehicle speed VL and the accelerator opening degree Acc corresponding to an operation amount of the accelerator pedal 27, for example, and is divided into a motor running range using the second electric motor MG2 and an engine running range using the engine 24 based on the above description. For example, the motor running range is defined in a relatively lower vehicle speed and lower drive force range (lower accelerator opening degree range) and the engine running range is defined in a medium/higher vehicle speed and medium/higher drive force range (medium/higher accelerator opening degree range).

Therefore, for example, at vehicle start-up or during running with a light load, the motor running mode is implemented to perform the motor running using the second electric motor MG2 and if accelerated running is performed from this state, the motor running mode is switched to the engine running mode. In such a case, the hybrid drive control means 84 executes the engine starting process. When the charge remaining amount SOC of the electric storage device 32 becomes lower than a lower limit remaining amount set in advance, the hybrid drive control means 84 executes the engine starting process even if the current running state is within the motor running mode range.

Figure 5:
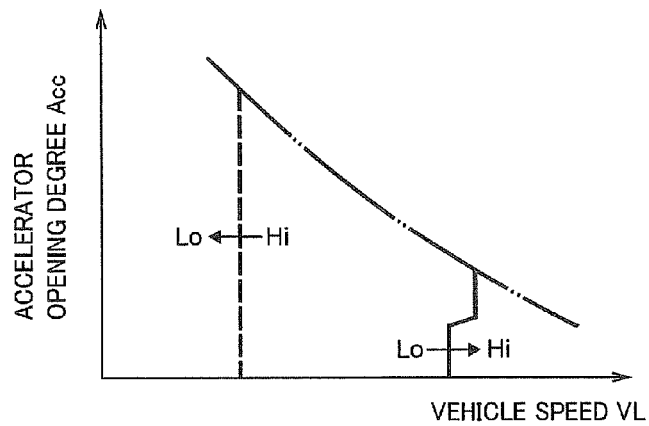
FIG. 5 is a preliminarily stored shift diagram for determining a shift of the automatic transmission based on the vehicle speed and the accelerator opening degree in the vehicle drive apparatus of FIG. 1.

The shift control means 86 determines a shift of the automatic transmission 22 based on the vehicle speed VL and the accelerator opening degree Acc from a preliminarily stored shift diagram (shift map) depicted in FIG. 5, for example, and executes a shift process to control the first brake B1 and the second brake B2 so as to make the shift to a shift stage determined by the determination result. In FIG. 5, a solid line is an upshift line (up-line) for switching from the low-speed stage Lo to the high-speed stage Hi and a broken line is a downshift line (down-line) for switching from the high-speed stage Hi to the low-speed stage Lo with predefined hysteresis disposed between upshift and downshift. Shift lines indicated by these solid and broken lines correspond to shift rules and a shift is performed in accordance with these shift lines. Therefore, the shift control means 86 functionally includes a shift determining means determining a shift of the automatic transmission 22 based on the shift diagram depicted in FIG. 5.

The shift control means 86 outputs a shift command for switching to the determined shift stage to a hydraulic control circuit 50 of the automatic transmission 22. The hydraulic control circuit 50 drives a linear solenoid valve included in the hydraulic control circuit 50 in accordance with the shift command to switch the respective operation states of the first brake B1 and the second brake B2.

For example, when the upshift line is crossed because, for example, a running state of a vehicle is accelerated during running at the low-speed stage Lo (with the second brake B2 engaged), the shift control is provided to release the second brake B2 and engage the first brake B1. When the downshift line is crossed because, for example, a running state of a vehicle is decelerated during running at the high-speed stage Hi (with the first brake B1 engaged), the shift control is provided to release the first brake B1 and engage the second brake B2.

The electric motor heat generation limiting control means 90 detects a temperature of the second electric motor MG2 (second electric motor temperature) from the second electric motor temperature sensor 54 and provides electric motor heat generation limiting control to limit the second electric motor torque Tmg2 to a predetermined limit value TLmg2 or less if the second electric motor temperature exceeds a predetermined upper limit temperature. For example, when the second electric motor torque Tmg2 is limited through the electric motor heat generation limiting control, if the second electric motor torque Tmg2 determined from the accelerator opening degree Acc is equal to or greater than the limit value TLmg2, the second electric motor torque Tmg2 is defined as the limit value TLmg2. On the other hand, if the second electric motor torque Tmg2 determined from the accelerator opening degree Acc is less than the limit value TLmg2, the second electric motor torque Tmg2 is not particularly necessary to be limited and is therefore set to a torque determined from the accelerator opening degree Acc. The upper limit temperature is empirically determined to prevent deterioration in durability due to heat generation of the second electric motor MG2. Although the limit value TLmg2 is a torque value greater than zero empirically determined such that the second electric motor temperature is promptly lowered if the second electric motor temperature exceeds the upper limit temperature, the electric motor heat generation limiting control may be provided as control of setting the second electric motor torque Tmg2 to zero if the second electric motor temperature exceeds the upper limit temperature. The electric motor heat generation limiting control means 90 also provides the electric motor heat generation limiting control as described above for the first electric motor MG1 so as to suppress the heat generation of the first electric motor MG1.

A main portion of the control at vehicle start-up will be described. Although the hybrid drive control means 84 switches a running mode to the motor running mode, the engine running mode, etc., as described above, the running mode is basically set to the motor running mode at vehicle start-up except when the second electric motor MG2 cannot be driven such as the case of an insufficient charge remaining amount SOC. In other words, the drive wheels 18 are driven only by the second electric motor MG2 without operating the engine 24. At vehicle start-up, as can be seen from the shift diagram of FIG. 5, the shift control means 86 sets the automatic transmission 22 to the low-speed stage Lo.

The hybrid drive control means 84 controls the second electric motor torque Tmg2 at vehicle start-up in accordance with a predetermined electric motor torque control characteristic STmg2 based on a requested drive force Freq requested by a driver. Since the drive wheels 18 are driven only by the second electric motor MG2 at vehicle start-up as described above, a drive force due to the second electric motor torque Tmg2 acts as the drive force Fc of the vehicle 8. The drive force (vehicle drive force) Fc of the vehicle 8 is, for example, a propulsive force (e.g., in "N") of the vehicle 8 and may be a physical value corresponding to the propulsive force of the vehicle 8 in one-to-one relationship. For example, since the motor running mode is used at vehicle start-up and the automatic transmission 22 is set to the low-speed stage Lo with the constant gear ratio γs, the second electric motor torque Tmg2 corresponds to the propulsive force of the vehicle 8 in one-to-one relationship.

Figure 6:
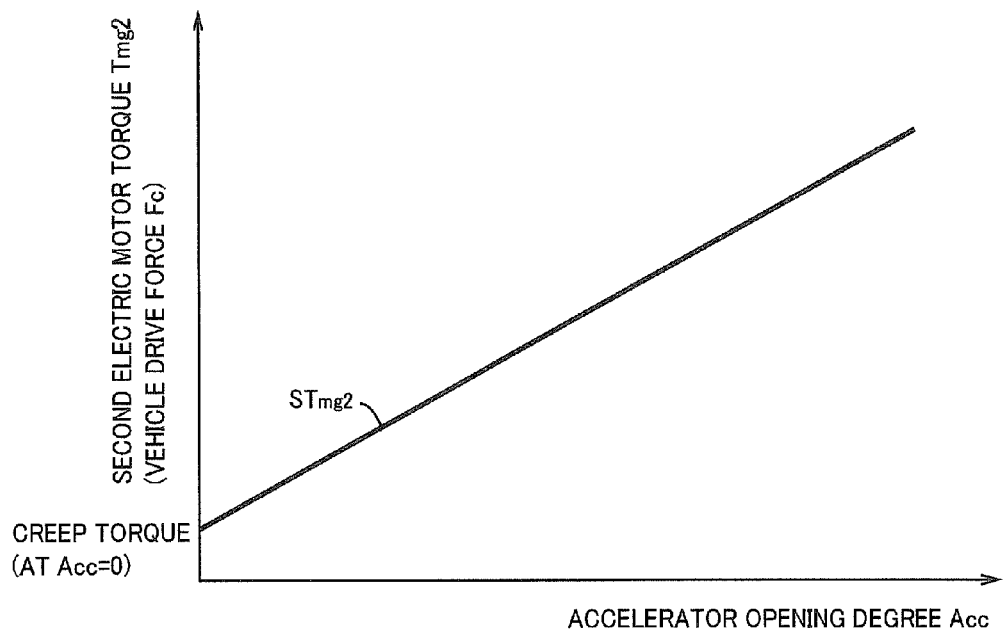
FIG. 6 is a diagram for explaining an electric motor torque control characteristic used for controlling the second electric motor torque by the electronic control device at vehicle start-up in the vehicle drive apparatus of FIG. 1.

Since a driver further presses down the accelerator pedal 27 if the driver wants to increase the vehicle drive force Fc, the requested drive force Freq corresponds to the accelerator opening degree Acc and becomes larger when the accelerator opening degree Acc is greater. As exemplarily illustrated in FIG. 6, the electric motor torque control characteristic STmg2 is defined as a relationship in which the second electric motor torque Tmg2 is made larger when the requested drive force Freq (accelerator opening degree Acc) is greater such that the vehicle drive force Fc becomes equal to the requested drive force Freq corresponding to the accelerator opening degree Acc. The motor running mode is used at vehicle start-up and, therefore, the vertical axis may indicate the vehicle drive force Fc instead in a case of FIG. 6. In this embodiment, to give a driver the same driving feeling as a creep phenomenon generated in an engine vehicle including an automatic transmission with a torque converter, the hybrid drive control means 84 drives the second electric motor MG2 to output a creep torque Tcrp that is a low torque empirically determined in advance corresponding to the time of the creep phenomenon while a vehicle can be started (e.g., when ignition is turned on) even if the accelerator opening degree Acc is zero during vehicle stop (see FIG. 6). Since the second electric motor MG2 etc., are basically controlled such that the vehicle drive force Fc becomes equal to the requested drive force Freq, the requested drive force Freq may be referred to as a target value of the vehicle drive force Fc, i.e., a target drive force.

The requested drive force judgment value setting means 92 sets a requested drive force judgment value F1req (e.g., in "N") necessary for determining execution of electric motor torque suppression control described later in advance before starting the electric motor torque suppression control. For this purpose, the requested drive force judgment value setting means 92 includes a necessary start-up drive force estimating means 94. The necessary start-up drive force estimating means 94 estimates a necessary start-up drive force F0 necessary for start-up of the vehicle 8 if the stopped vehicle 8 is started. For example, the necessary start-up drive force estimating means 94 estimates the necessary start-up drive force F0 when the running vehicle 8 stops or when the vehicle speed VL is reduced to the extent that the vehicle is predicted to stop, and estimates the necessary start-up drive force F0 based on a running state of the vehicle 8 before stop. Since a running resistance (e.g., in "N") against the vehicle drive force Fc is generated while the vehicle 8 is running and a running resistance at start-up (start-up running resistance Rr0) is generated at vehicle start-up, the vehicle 8 starts running when the vehicle drive force Fc exceeds the start-up running resistance Rr0; therefore, the necessary start-up drive force F0 is equal to the start-up running resistance Rr0; and estimating the necessary start-up drive force F0 is equivalent to estimating the start-up running resistance Rr0.

An example of a method of estimating the necessary start-up drive force F0 based on a running state before stop will be described. The necessary start-up drive force estimating means 94 preliminarily stores empirically calculated air resistance coefficient Cd and frontal projected area S ($m^2$) of the vehicle 8. The necessary start-up drive force estimating means 94 detects and stores a vehicle drive force Fc (N), a vehicle weight m1 (kg), an acceleration (vehicle acceleration) a1 ($m/s^2$) of the vehicle 8, a vehicle speed VL (m/s), an ambient temperature Tair (degrees C.), and an atmosphere pressure Pair (hPa) at the time of the running before stop, preferably at the time of running immediately before stop, for example, at the time of running that is close in terms of time and distance to a time point at which start-up will be attempted after a vehicle is stopped and when a vehicle speed VL is low, on the condition that the brake pedal 29 is not pressed down. The necessary start-up drive force estimating means 94 calculates the start-up running resistance Rr0, i.e., the necessary start-up drive force F0 based on these parameters. Specifically, the necessary start-up drive force estimating means 94 calculates an air density ρair (kg/m$^3$) based on the ambient temperature Tair (degrees C.) and the atmosphere pressure Pair (hPa) from the following equation (1), calculates an air resistance Rair (N) based on the air density ρair, the air resistance coefficient Cd, the frontal projected area S (m$^2$), and the vehicle speed VL (m/s) from the following equation (2), calculates a running resistance Rrn (N) based on the vehicle drive force Fc (N), the vehicle weight m1 (kg), and the vehicle acceleration a1 (m/s$^2$) from the following equation (3), and calculates the start-up running resistance Rr0 (necessary start-up drive force F0) based on the running resistance Rrn and the air resistance Rair from the following equation (4). In this way, the necessary start-up drive force estimating means 94 estimates the start-up running resistance Rr0 (necessary start-up drive force F0) based on a running state before stop of the vehicle 8.

$$\rho air = 1.293 \times (273.2/(273.2 + Tair)) \times Pair/1013 \quad (1)$$

$$Rair = Cd \times S \times \rho air \times VL^2/2 \quad (2)$$

$$Rrn = Fc - m1 \times a1 \quad (3)$$

$$Rr0 = Rrn - Rair \quad (4)$$

After the necessary start-up drive force estimating means 94 estimates the start-up running resistance Rr0 (necessary start-up drive force F0) as described above, the requested drive force judgment value setting means 92 sets the requested drive force judgment value Flreq to a value equal to or less than the necessary start-up drive force F0 (Flreq≤F0) based on the estimated necessary start-up drive force F0. The requested drive force judgment value Flreq is preferably a value equal to or less than and closer to the necessary start-up drive force F0 and is a value greater than the vehicle drive force Fc corresponding to the creep torque Tcrp or greater than zero. For example, the requested drive force judgment value Flreq may be set to a value acquired by subtracting an empirically predetermined constant value sufficiently smaller than the necessary start-up drive force F0 from the necessary start-up drive force F0; however, the requested drive force judgment value Flreq is set to the same value as the necessary start-up drive force F0 in this embodiment. Therefore, the requested drive force judgment value setting means 92 sets the requested drive force judgment value Flreq to the necessary start-up drive force F0 estimated by the necessary start-up drive force estimating means 94. Although the requested drive force judgment value Flreq may be defined as a constant value as long as the estimated necessary start-up drive force F0 is not exceeded, the requested drive force judgment value Flreq is set depending on the necessary start-up drive force F0 as described above and, therefore, the requested drive force judgment value Flreq is set to be larger when the necessary start-up drive force F0 is greater.

The requested drive force determining means 96 determines whether the requested drive force Freq is equal to or less than the requested drive force judgment value Flreq set by the requested drive force judgment value setting means 92. Since the requested drive force Freq corresponds to the accelerator opening degree Acc, the requested drive force determining means 96 may replace the requested drive force Freq with the accelerator opening degree Acc to make the determination and, in this case, it is determined whether the accelerator opening degree Acc is equal to or less than an accelerator opening degree judgment value corresponding to the requested drive force judgment value Flreq. The requested drive force determining means 96 preferably makes a determination on the requested drive force Freq during stop of the vehicle 8 (while the vehicle speed VL is zero) or when the vehicle speed VL is equal to or less than a start-up success judgment vehicle speed VLsrt that is a low speed empirically determined in advance for determining the completion of start-up of the vehicle 8.

When a driver starts the stopped vehicle 8, if the requested drive force determining means 96 determines that the requested drive force Freq is equal to or less than the requested drive force judgment value Flreq, the electric motor torque suppression control means 98 provides the electric motor torque suppression control to suppress the second electric motor torque Tmg2 below an output torque determined from the electric motor torque control characteristic STmg2. When the electric motor torque suppression control is provided, the hybrid drive control means 84 controls the second electric motor torque Tmg2 with higher priority given to the electric motor torque suppression control over the electric motor torque control characteristic STmg2. In other words, when a driver starts the stopped vehicle 8, if the requested drive force determining means 96 determines that the requested drive force Freq exceeds the requested drive force judgment value Flreq, the electric motor torque suppression control means 98 controls the second electric motor torque Tmg2 via the hybrid drive control means 84 in accordance with the electric motor torque control characteristic STmg2. Starting the stopped vehicle 8 in the above description means the time of start-up of the vehicle 8 and refers to, for example, a period until a running state determined as the completion of vehicle start-up is achieved by pressing-down of the accelerator pedal 27 etc., after the running vehicle 8 is stopped. A running state determined as the completion of vehicle start-up may be a state in which the vehicle speed VL is greater than zero; however, preferably, the running state is defined as a state in which the vehicle speed VL is greater than the start-up success judgment vehicle speed VLsrt so as to ensure that the electric motor torque suppression control is more steadily provided. When determining whether the vehicle start-up is completed, the electric motor torque suppression control means 98 acts as a vehicle start-up completion determining means.

The electric motor torque suppression control means 98 suppresses the second electric motor torque Tmg2 through the electric motor torque suppression control as described above and, for example, when the second electric motor torque Tmg2 is suppressed through the electric motor torque suppression control, the second electric motor torque Tmg2 may be set to zero; however, in this embodiment, the second electric motor torque Tmg2 is suppressed such that the creep torque Tcrp is generated in the second electric motor MG2.

The suppression of the second electric motor torque Tmg2 through the electric motor torque suppression control in the case of starting the stopped vehicle 8 (at vehicle start-up) will briefly be described with reference to FIG. 7. In FIG. 7, for simplicity of description, the description will be made on the assumptions that the estimated necessary start-up drive force F0 (the start-up running resistance Rr0) is set as the requested drive force judgment value Flreq, that the estimated necessary start-up drive force F0 (the start-up running resistance Rr0) is equivalent to the actual start-up running resistance Rr0, and that the vehicle drive force Fc is equal to the requested drive force Freq when the second electric motor torque Tmg2 is not suppressed through the electric motor torque suppression control.

In FIG. 7, in the case of starting the stopped vehicle 8, the vehicle 8 is not started as long as the vehicle drive force Fc corresponding to the second electric motor torque Tmg2 is equal to or less than the start-up running resistance Rr0. If the vehicle drive force Fc exceeds the start-up running resistance Rr0, the vehicle 8 is started. Assuming that the electric motor torque suppression control is not provided, as indicated by a broken line L01, the vehicle drive force Fc (the second electric motor torque Tmg2) increases based on the electric motor torque control characteristic STmg2 in association with increase in the accelerator opening degree Acc. On the other hand, assuming that the electric motor torque suppression control is provided, as indicated by a solid line L02, the second electric motor torque Tmg2 is suppressed as long as the vehicle drive force Fc is equal to or less than the start-up running resistance Rr0 (the requested drive force judgment value Flreq) and, therefore, for example, the vehicle drive force Fc is suppressed to a level corresponding to the creep torque Tcrp. If the vehicle drive force Fc exceeds the start-up running resistance Rr0, the vehicle drive force Fc increases based on the electric motor torque control characteristic STmg2 in association with increase in the accelerator opening degree Acc in both the broken line L01 and the solid line L02 in the same manner. If the electric motor torque suppression control means 98 sets the second electric motor torque Tmg2 to zero instead of the creep torque Tcrp when the second electric motor torque Tmg2 is suppressed through the electric motor torque suppression control, the vehicle drive force Fc is as indicated by a dashed-dotted line L03 in FIG. 7.

FIG. 8 is a time chart for explaining the suppression of the vehicle drive force Fc (the second electric motor torque Tmg2) through the electric motor torque suppression control when the start-up of the vehicle 8 is taking as an example. In FIG. 8, as is the case with FIG. 7, for simplicity of description, the description will be made on the assumptions that the estimated necessary start-up drive force F0 (the start-up running resistance Rr0) is set as the requested drive force judgment value Flreq, that the estimated necessary start-up drive force F0 (the start-up running resistance Rr0) is equivalent to the actual start-up running resistance Rr0, and that the vehicle drive force Fc is equal to the requested drive force Freq when the second electric motor torque Tmg2 is not suppressed through the electric motor torque suppression control. A system temperature TMP of FIG. 8 is, for example, the second electric motor temperature or temperature of operating oil etc., of the automatic transmission 22 for cooling the electric motors MG1, MG2. In FIG. 8, broken lines correspond to the time chart on the assumption that the electric motor torque suppression control is not provided and solid lines correspond to the time chart on the assumption that the electric motor torque suppression control is provided.

At a time point $t_{A1}$ of FIG. 8, the vehicle speed VL is zero, i.e., the vehicle 8 is stopped, and the accelerator opening degree Acc is zero, and the accelerator opening degree Acc starts increasing because the accelerator pedal 27 is pressed down from the time point $t_{A1}$. At a time point $t_{A2}$, the requested drive force Freq corresponding to the accelerator opening degree Acc reaches the start-up running resistance Rr0 (the requested drive force judgment value Flreq). Therefore, in the time chart represented by the solid lines, the vehicle drive force Fc is suppressed to, for example, a level corresponding to the creep torque Tcrp through the electric motor torque suppression control between the time point $t_{A1}$ and the time point $t_{A2}$. After the time point $t_{A2}$, the suppression of the second electric motor torque Tmg2 through the electric motor torque suppression control is canceled and the vehicle drive force Fc increases based on the electric motor torque control characteristic STmg2 in association with increase in the accelerator opening degree Acc and the vehicle speed VL smoothly rises from the time point $t_{A2}$. Since the second electric motor torque Tmg2 is suppressed through the electric motor torque suppression control until the time point $t_{A2}$, the system temperature TMP is maintained at a sufficiently lower level without exceeding the upper limit temperature.

In contrast, in the time chart represented by the broken lines, since the drive current Img2 is supplied to the second electric motor MG2 in accordance with the electric motor torque control characteristic STmg2 from the time point $t_{A1}$ although the second electric motor MG2 does not rotate, the system temperature TMP (the second electric motor temperature) rises from the time point $t_{A1}$ and the system temperature TMP temporarily exceeds the upper limit temperature before and after the time point $t_{A2}$. Therefore, while the system temperature TMP exceeds the upper limit temperature, the electric motor heat generation limiting control means 90 provides the electric motor heat generation limiting control for torque-down of the second electric motor MG2, resulting in temporal reduction in the vehicle drive force Fc before and after the time point $t_{A2}$. The accelerator opening degree Acc increases during the provision of the electric motor heat generation limiting control. After the torque-down of the second electric motor MG2 is cancelled, the vehicle drive force Fc returns to a level corresponding to the accelerator opening degree Acc in accordance with the electric motor torque control characteristic STmg2 and, since the returned vehicle drive force Fc is greater than the start-up running resistance Rr0, the vehicle speed VL is abruptly increased at the time point of the cancellation of the torque-down of the second electric motor MG2. The abrupt increase in the vehicle drive force Fc exceeding the start-up running resistance Rr0 in association with the cancellation of the torque-down of the second electric motor MG2 tends to cause wheelspin etc.

Figure 9:
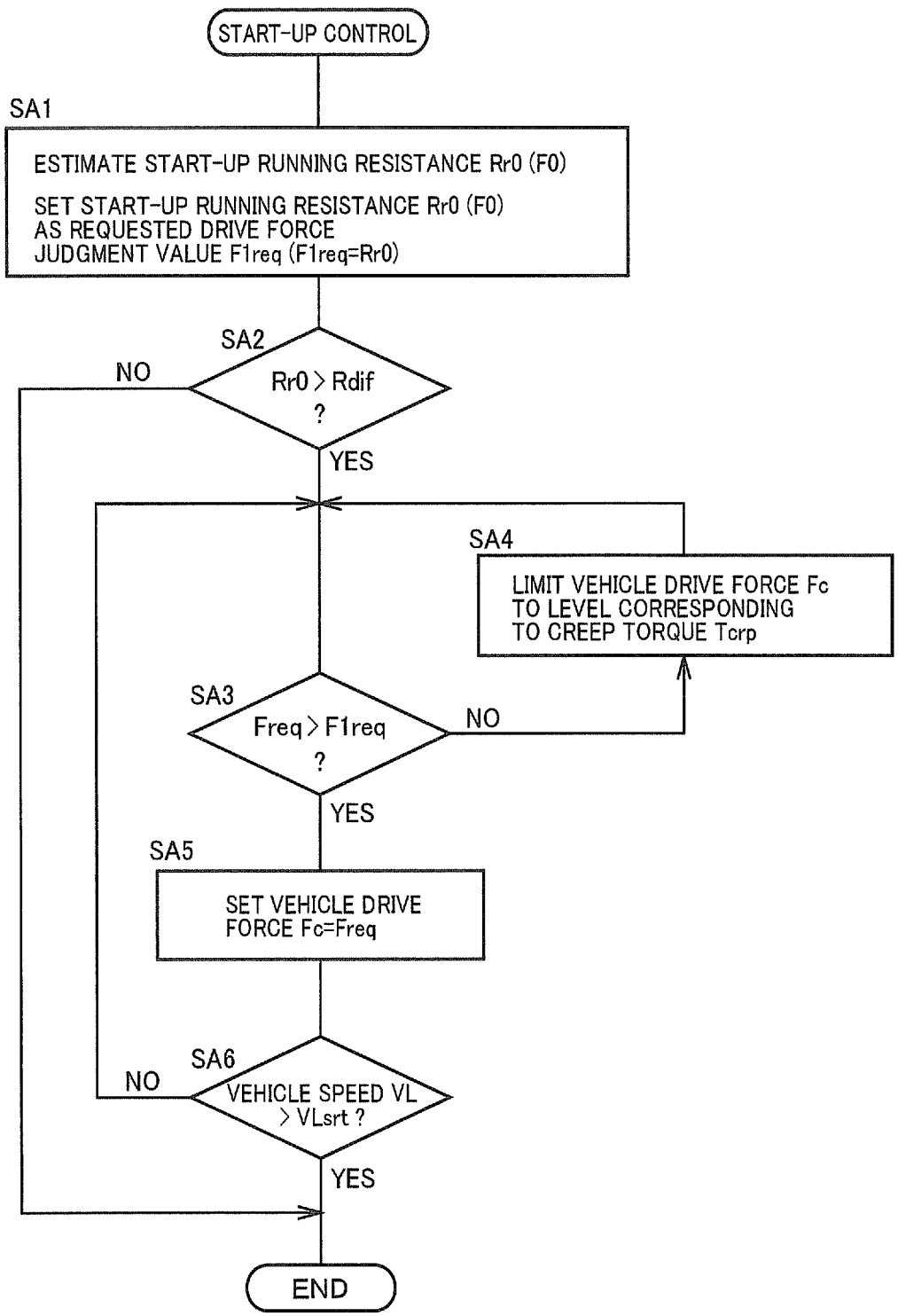
FIG. 9 is a flowchart in the first embodiment for explaining a main portion of the control operation of the electronic control device of FIG. 4, i.e., start-up control, which is control of the vehicle drive force Fc at vehicle start-up.

FIG. 9 is a flowchart for explaining a main portion of the control operation of the electronic control device 28, i.e., start-up control, which is control of the vehicle drive force Fc at vehicle start-up. The control operation depicted in FIG. 9 is performed solely or concurrently with another control operation. For example, the flowchart of FIG. 9 is started if the running vehicle 8 is stopped or if the vehicle speed VL is reduced to the extent that the vehicle is predicted to stop.

First, at step SA1 (hereinafter, step is omitted) of FIG. 9, the start-up running resistance Rr0, i.e., the necessary start-up drive force F0 is estimated. For example, the estimation is made by calculation using the equations (1) to (4) based on the running state before stop. When the estimation of the necessary start-up drive force F0 is completed, the necessary start-up drive force F0 is directly set as the requested drive force judgment value Flreq, for example. SA1 corresponds to the requested drive force judgment value setting means 92 and the necessary start-up drive force estimating means 94.

At SA2 corresponding to the electric motor torque suppression control means 98, it is determined whether the start-up running resistance Rr0 estimated at SA1 is greater than a predetermined start-up running resistance judgment value Rdif. The start-up running resistance judgment value Rdif is empirically set in advance as a judgment value that is likely to make start-up of the vehicle 8 impossible if the start-up running resistance Rr0 is greater than the value Rdif, for example. If the determination at SA2 is affirmative, i.e., if the start-up running resistance Rr0 is greater than the start-up running resistance judgment value Rdif, the procedure goes to SA3. In contrast, if the determination at SA2 is negative, the flowchart is terminated.

At SA3 corresponding to the requested drive force determining means 96, it is determined whether the requested drive force Freq is greater than the requested drive force judgment value Flreq set at SA1. If the determination at SA3 is affirmative, i.e., if the requested drive force Freq is greater than the requested drive force judgment value Flreq, the procedure goes to SA5. In contrast, if the determination at SA3 is negative, the procedure goes to SA4.

At SA4 corresponding to the electric motor torque suppression control means 98, the second electric motor torque Tmg2 is suppressed through the provision of the electric motor torque suppression control. Therefore, the vehicle drive force Fc is suppressed. For example, the second electric motor torque Tmg2 is set to the creep torque Tcrp and the vehicle drive force Fc is limited to a level corresponding to the creep torque Tcrp. SA4 is executed until the determination of SA3 becomes affirmative.

At SA5 corresponding to the hybrid drive control means 84 and the electric motor torque suppression control means 98, the second electric motor torque Tmg2 is controlled in accordance with the electric motor torque control characteristic STmg2 based on the accelerator opening degree Acc (the requested drive force Freq). Therefore, the second electric motor MG2 is controlled such that the vehicle drive force Fc becomes equal to the requested drive force Freq.

At SA6 corresponding to the electric motor torque suppression control means (vehicle start-up completion determining means) 98, it is determined whether the vehicle speed VL is greater than the start-up success judgment vehicle speed VLsrt. If the determination at SA6 is affirmative, i.e., if the vehicle speed VL is greater than the start-up success judgment vehicle speed VLsrt, it can be determined that the start-up of the vehicle 8 is completed and, therefore, the flowchart is terminated. In contrast if the determination at SA6 is negative, the procedure goes to SA3.

This embodiment has the following effects (A1) to (A6).

(A1) According to this embodiment, in the case of starting the stopped vehicle 8, if the requested drive force Freq is equal to or less than the requested drive force judgment value Flreq, the electric motor torque suppression control means 98 provides the electric motor torque suppression control to suppress the second electric motor torque Tmg2 below an output torque determined from the electric motor torque control characteristic STmg2. In other words, in the case of starting the stopped vehicle 8, if the requested drive force Freq exceeds the requested drive force judgment value Flreq, the electric motor torque suppression control means 98 controls the second electric motor torque Tmg2 via the hybrid drive control means 84 in accordance with the electric motor torque control characteristic STmg2. Therefore, even if the requested drive force Freq (the accelerator opening degree Acc) is increased within a range in which the vehicle 8 cannot be started, the electricity consumption of the second electric motor torque Tmg2 is suppressed as compared to that in the case of following the electric motor torque control characteristic STmg2 and, as a result, an energy loss and unnecessary heat generation of the second electric motor MG2 can be suppressed at vehicle start-up. Since the suppression of unnecessary heat generation results in reduction in frequency of provision of the electric motor heat generation limiting control, the startability of the vehicle 8 can be restrained from deteriorating due to torque-down caused by the provision of the electric motor heat generation limiting control. Since the vehicle drive force Fc is controlled in accordance with the electric motor torque control characteristic STmg2 if the requested drive force Freq exceeds the requested drive force judgment value Flreq, no sense of discomfort is given to a driver at vehicle start-up and comfortability of the driver can be prevented from being impaired.

(A2) According to this embodiment, if the second electric motor temperature exceeds the predetermined upper limit temperature, the electric motor heat generation limiting control means 90 provides the electric motor heat generation limiting control to limit the second electric motor torque Tmg2 to the predetermined limit value TLmg2 or less. Therefore, the second electric motor temperature can be restrained from rising.

(A3) According to this embodiment, since the electric motor torque suppression control means 98 suppresses the second electric motor torque Tmg2 so as to generate the creep torque Tcrp in the electric motor torque suppression control, the state same as the stopped vehicle state is easily maintained before start-up or at start-up of the vehicle 8.

(A4) According to this embodiment, the electric motor torque suppression control means 98 may set the second electric motor torque Tmg2 to zero when suppressing the second electric motor torque Tmg2 through the electric motor torque suppression control and, in this case, an energy loss and unnecessary heat generation of the second electric motor MG2 can considerably be restrained at vehicle start-up as compared to those when the second electric motor torque Tmg2 is not set to zero.

(A5) According to this embodiment, the necessary start-up drive force estimating means 94 estimates the necessary start-up drive force F0 based on a running state before stop of the vehicle 8 and the requested drive force judgment value setting means 92 sets the requested drive force judgment value Flreq in advance to the necessary start-up drive force F0 estimated by the necessary start-up drive force estimating means 94. Therefore, the requested drive force judgment value Flreq can be set even if the requested drive force Freq is not increased and decreased once during vehicle stop, for example.

(A6) According to this embodiment, since the requested drive force judgment value Flreq is set to be larger when the necessary start-up drive force F0 is greater, an energy loss and unnecessary heat generation of the second electric motor MG2 can appropriately be suppressed at vehicle start-up depending on a change in the necessary start-up drive force F0 (the start-up running resistance Rr0).

Another embodiment of the present invention will then be described. In the following description, the portions common to each of the embodiments are denoted by the same reference numerals and will not be described.

Second Embodiment

In this embodiment, description will be made of an example of the electric motor torque suppression control provided if the requested drive force Freq is once increased and decreased and then increased again during vehicle stop. For example, the requested drive force Freq may repeatedly be increased and decreased during vehicle stop on a road surface condition where the vehicle 8 is difficult to start such as a sand area and, therefore, the requested drive force Freq may once be increased and decreased and then increased again during vehicle stop as described above. Differences from the first embodiment will hereinafter mainly be described.

In this embodiment, a start-up mode switch 208 (see FIG. 10) operated by a driver etc., is disposed near a driver seat so that the driver can easily operate the switch, for example. If the start-up mode switch 208 is operated during vehicle stop, a start-up mode is selected that is selected when the vehicle 8 is started. Although the start-up mode may manually be canceled, the start-up mode is preferably automatically cancelled when a running state determinable as the completion of start-up of the vehicle 8 is achieved, for example, when the vehicle speed VL becomes greater than the start-up success judgment vehicle speed VLsrt. The start-up mode is a running mode for suppressing slipping etc., of the drive wheels 18 to facilitate the start-up of the vehicle 8 and, for example, as generally known, control is provided in the start-up mode such that the vehicle drive force Fc moderately increases rather than abruptly increasing even if the accelerator opening degree Acc is abruptly increased, so as to prevent slipping etc., of the drive wheels 18. For example, if a driver determines that the vehicle 8 is in a condition that makes start-up difficult when starting the vehicle, the driver operates the start-up mode switch 208 to select the start-up mode. Therefore, the start-up mode may be referred to as an escape mode and the start-up mode switch 208 may be referred to as an escape mode switch.

FIG. 10 is a functional block diagram for explaining a main portion of the control function of the electronic control device 28 in this embodiment. In the block diagram of FIG. 10, as compared to FIG. 4, the requested drive force judgment value setting means 92 is replaced with a requested drive force judgment value setting means 214 and a start-up mode switchover determining means 212 is added.

The start-up mode switchover determining means 212 determines whether the start-up mode is selected, from the operation of the start-up mode switch 208. The start-up mode switchover determining means 212 determines that the start-up mode is not selected if the start-up mode is canceled because of successful vehicle start-up.

The requested drive force judgment value setting means 214 sets the requested drive force judgment value Flreq in advance before starting the electric motor torque suppression control as is the case with the requested drive force judgment value setting means 92 of FIG. 4 and does not include the necessary start-up drive force estimating means 94 unlike the requested drive force judgment value setting means 92. If the requested drive force Freq is once increased and decreased during stop of the vehicle 8 and the vehicle is still stopped, the requested drive force judgment value setting means 214 sets the requested drive force judgment value Flreq to a maximum value Fslp (hereinafter referred to as a "pre-slipping maximum drive force Fslp") of the vehicle drive force Fc when the drive wheels 18 do not rotate (e.g., when no slipping occurs) during increase and decrease of the requested drive force. For example, the requested drive force judgment value setting means 214 sequentially detects the supply current Img2 to the second electric motor MG2 during vehicle stop, obtains the vehicle drive force Fc from the supply current Img2 by sequential calculations etc., and sets the requested drive force judgment value Flreq when the increasing accelerator opening degree Acc is changed to decrease or when the accelerator opening degree Acc once increases and decreases and then returns to zero or substantially zero. Describing for confirmation, the requested drive force judgment value setting means 214 does not set the requested drive force judgment value Flreq at the first increase in the requested drive force Freq after the running vehicle 8 stops. Although the requested drive force judgment value setting means 214 may set the requested drive force judgment value Flreq if the running mode is selected, the requested drive force judgment value setting means 214 sets the requested drive force judgment value Flreq regardless of whether the running mode is selected in this embodiment.

If the requested drive force Freq is repeatedly increased and decreased a number of times during stop of the vehicle 8, the requested drive force judgment value setting means 214 may set the requested drive force judgment value Flreq to the pre-slipping maximum drive force Fslp during the last increase and decrease of the requested drive force Freq; however, the requested drive force judgment value setting means 214 preferably sets the requested drive force judgment value Flreq to the pre-slipping maximum drive force Fslp of the entire period of vehicle stop as long as the vehicle 8 is continuously stopped. When setting the requested drive force judgment value Flreq, the requested drive force judgment value setting means 214 must detect whether the drive wheels 18 rotate although the vehicle is stopped, i.e., whether slipping (wheelspin) of the drive wheels 18 occurs and, for example, this can be detected based on a change in the supply current Img2 to the second electric motor MG2, a change in the output shaft rotation speed Nout, etc. Although the requested drive force judgment value setting means 214 sets the requested drive force judgment value Flreq to the pre-slipping maximum drive force Fslp as described above, the requested drive force judgment value Flreq may be set to a drive force equal to or less than the pre-slipping maximum drive force Fslp. In this case, for example, the requested drive force judgment value Flreq is set to a value acquired by multiplying the pre-slipping maximum drive force Fslp by a predetermined value less than one or a value acquired by subtracting an empirically predetermined constant value from the pre-slipping maximum drive force Fslp.

Although the electric motor torque suppression control means 98 of the present embodiment provides the electric motor torque suppression control as is the case with the first embodiment, the electric motor torque suppression control means 98 provides the electric motor torque suppression control on the condition that the start-up mode switchover determining means 212 determines that the start-up mode is selected because the start-up mode switch 208 is disposed in this embodiment. In this embodiment, as described above, since the requested drive force judgment value Flreq is not set before the requested drive force Freq is once increased and decreased during stop of the vehicle 8 and the requested drive force judgment value Flreq is a parameter for determining whether the electric motor torque suppression control means 98 provides the electric motor torque suppression control, the electric motor torque suppression control is provided if the requested drive force Freq is once increased and decreased and then increased again during vehicle stop.

If the requested drive force Freq is increased and decreased during stop of the vehicle 8, the supply current Img2 to the second electric motor MG2 is increased and decreased although the second electric motor MG2 does not rotate as described above and it is therefore thought that the second electric motor temperature may exceed the upper limit temperature. In this case, as described in the first embodiment, the electric motor heat generation limiting control means 90 provides the electric motor heat generation limiting control to reduce the vehicle drive force Fc corresponding to the second electric motor torque Tmg2. Setting of the requested drive force judgment value Flreq by the requested drive force judgment value setting means 214 will be described with reference to FIG. 11 by taking the case of the electric motor heat generation limiting control provided when the requested drive force Freq is increased and decreased during vehicle stop as an example.

FIG. 11 is a time chart for explaining the setting of the requested drive force judgment value Flreq and the suppression of the vehicle drive force Fc (the second electric motor torque Tmg2) through the electric motor torque suppression control, by way of example, if the electric motor heat generation limiting control is provided at start-up of the vehicle 8 when the accelerator opening degree Acc is increased and decreased during vehicle stop and the opening degree Acc is subsequently increased again, causing the vehicle to start. In FIG. 11, as is the case with FIG. 8, the description will be made on the assumption that the vehicle drive force Fc is equal to the requested drive force Freq when the second electric motor torque Tmg2 is not suppressed through the electric motor torque suppression control. The system temperature TMP of FIG. 11 is, for example, the second electric motor temperature or temperature of operating oil etc., of the automatic transmission 22 for cooling the electric motors MG1, MG2.

At a time point $t_{B1}$ of FIG. 11, the vehicle speed VL is zero, i.e., the vehicle 8 is stopped, and the accelerator opening degree Acc is zero. The accelerator pedal 27 is once pressed down from the time point $t_{B1}$ and the accelerator opening degree Acc (the requested drive force Freq) is once increased and decreased although the vehicle 8 is still stopped between the time point $t_{B1}$ and a time point $t_{B2}$. This is a first pressing-down of the accelerator pedal.

In FIG. 11, the system temperature TMP (the second electric motor temperature) rises in association with the increase of the accelerator opening degree Acc between the time point $t_{B1}$ and the time point $t_{B2}$ and exceeds the upper limit temperature in a portion between the time point $t_{B1}$ and the time point $t_{B2}$. Therefore, while the system temperature TMP exceeds the upper limit temperature, the electric motor heat generation limiting control means 90 provides the electric motor heat generation limiting control for torque-down of the second electric motor MG2, resulting in temporal reduction in the vehicle drive force Fc. On the other hand, referring to the time chart of the accelerator opening degree Acc of FIG. 11, since the accelerator opening degree Acc is greater at the time of cancellation of the torque-down, i.e., at the end of the electric motor heat generation limiting control, than that at the start of the torque-down, the vehicle drive force Fc at the time of cancellation (immediately after the cancellation) of the torque-down is greater than that at the start (immediately before the start) of the torque-down. As depicted in the time chart of the vehicle drive force Fc, since the vehicle drive force Fc is smaller than the start-up running resistance Rr0 at the start of the torque-down and exceeds the start-up running resistance Rr0 at the time of cancellation of the torque-down, the cancellation of the torque-down causes slipping (wheelspin) of the drive wheels 18 at the time of the cancellation. Because of the slipping of the drive wheels 18, the vehicle speed VL detected by the output shaft rotation speed sensor 45 temporarily rises at the time of cancellation of the torque-down. Whether the slipping of the drive wheels 18 is caused by the cancellation of the torque-down can be determined from a temporal difference between the time of cancellation of the torque-down and the start of the slipping of the drive wheels 18, for example.

At a time point $t_{B3}$, the start-up mode switch 208 (the escape mode switch 208) is turned on (ON) to select the start-up mode. Therefore, the start-up mode switchover determining means 212 determines that the start-up mode is selected at the time point $t_{B3}$. The accelerator pedal 27 is pressed down again from a time point $t_{B4}$ and the accelerator opening degree Acc is increased. In other words, the requested drive force Freq is once increased and decreased between the time point $t_{B1}$ and the time point $t_{B2}$ and then increased again from the time point $t_{B4}$ during vehicle stop. The increase in the accelerator opening degree Acc after the time point $t_{B4}$ corresponds to a second pressing-down of the accelerator pedal.

Between the time point $t_{B1}$ and the time point $t_{B2}$ of FIG. 11, since the slipping of the drive wheels 18 occurs at the time of cancellation of the torque-down, the maximum value Fslp (the pre-slipping maximum drive force Fslp) of the vehicle drive force Fc without rotation (without slipping) of the drive wheels 18 is the vehicle drive force Fc indicated by a point P01 of FIG. 11, i.e., the vehicle drive force Fc at the start of the output torque limitation of the second electric motor MG2 through the electric motor heat generation limiting control. Therefore, the requested drive force judgment value setting means 214 sets the requested drive force judgment value Flreq to the vehicle drive force Fc at the start of the torque-down, i.e., the vehicle drive force Fc indicated by the point P01 of FIG. 11. In other words, describing in a generalized manner, if slipping (wheelspin) of the drive wheels 18 occurs due to cancellation of the output torque limitation of the second electric motor MG2 through the electric motor heat generation limiting control provided by the electric motor heat generation limiting control means 90 during increase and decrease of the requested drive force (between the time point $t_{B1}$ and the time point $t_{B2}$), the requested drive force judgment value setting means 214 sets the requested drive force judgment value Flreq to the vehicle drive force Fc at the start of the output torque limitation (at the start of the torque-down) of the second electric motor MG2 through the electric motor heat generation limiting control. For example, in FIG. 11, the requested drive force judgment value setting means 214 sets the requested drive force judgment value Flreq at the time point $t_{B2}$ when the accelerator opening degree Acc is once returned to zero.

At a time point $t_{B5}$, it is depicted that the requested drive force Freq increased from the time point $t_{B4}$ in accordance with the accelerator opening degree Acc reaches and exceeds the requested drive force judgment value Flreq set to the vehicle drive force Fc indicated by the point P01. Therefore, the electric motor torque suppression control means 98 provides the electric motor torque suppression control between the time point $t_{B4}$ and the time point $t_{B5}$, i.e., within a period indicted by an arrow TM1; the suppression of the second electric motor torque Tmg2 through the electric motor torque suppression control is canceled after the time point $t_{B5}$; and the vehicle drive force Fc increases based on the electric motor torque control characteristic STmg2 in association with increase in the accelerator opening degree Acc. Since the vehicle drive force Fc exceeds the start-up running resistance Rr0 at a time point after a short time from the time point $t_{B5}$, the vehicle speed VL increases from that time point.

FIG. 12 is a flowchart for explaining a main portion of the control operation of the electronic control device 28 of this embodiment, i.e., control of the vehicle drive force Fc at vehicle start-up. The control operation depicted in FIG. 12 is performed solely or concurrently with another control operation. For example, the flowchart of FIG. 12 is performed if the vehicle is still stopped although the requested drive force Freq is once increased and decreased during stop of the vehicle 8 and the start-up mode switchover determining means 212 determines that the start-up mode (escape mode) is selected. SB2 to SB5 of FIG. 12 are the same as SA3 to SA6, respectively, of FIG. 9 described in the first embodiment and therefore will not be described.

First, at step SB1 of FIG. 12, after the requested drive force Freq is once increased and decreased during stop of the vehicle 8, the requested drive force judgment value Flreq is set to the maximum value Fslp (the pre-slipping maximum drive force Fslp) of the vehicle drive force Fc when the drive wheels 18 do not rotate (e.g., when no slipping occurs) during increase and decrease of the requested drive force Freq. For example, the requested drive force judgment value Flreq is set to the vehicle drive force Fc indicated by the point P01 in the time chart of FIG. 11. SB1 corresponds to the requested drive force judgment value setting means 214.

If the determination at SB5 is affirmative, the procedure goes to SB6 and, at SB6, the start-up mode (escape mode) is canceled.

This embodiment has the following effects (B1) to (B3) in addition to the effects (A1) to (A4) of the first embodiment. (B1) According to this embodiment, the electric motor torque suppression control is provided if the requested drive force Freq is once increased and decreased and then increased again during vehicle stop and, if the vehicle is still stopped after the requested drive force Freq is once increased and decreased during stop of the vehicle 8, the requested drive force judgment value setting means 214 sets the requested drive force judgment value Flreq to the maximum value Fslp (the pre-slipping maximum drive force Fslp) of the vehicle drive force Fc when the drive wheels 18 do not rotate (e.g., when no slipping occurs) during increase and decrease of the requested drive force. Therefore, the requested drive force judgment value Flreq can easily and appropriately be set.

(B2) According to this embodiment, for example, in the time chart of FIG. 11, if slipping (wheelspin) of the drive wheels 18 occurs due to cancellation of the output torque limitation of the second electric motor MG2 through the electric motor heat generation limiting control provided by the electric motor heat generation limiting control means 90 during increase and decrease of the requested drive force (between the time point $t_{B1}$ and the time point $t_{B2}$), the requested drive force judgment value setting means 214 sets the requested drive force judgment value Flreq to the vehicle drive force Fc at the start of the output torque limitation (at the start of the torque-down) of the second electric motor MG2 through the electric motor heat generation limiting control. Therefore, the drive wheels 18 can be restrained from repeatedly slipping due to the output torque limitation of the second electric motor MG2 through the electric motor heat generation limiting control at vehicle start-up.

(B3) According to this embodiment, the electric motor torque suppression control means 98 provides the electric motor torque suppression control on the condition that the start-up mode switchover determining means 212 determines that the start-up mode is selected. Therefore, the electric motor torque suppression control can be provided, for example, in accordance with the intention of a driver selecting the start-up mode at vehicle start-up.

Although the embodiments of the present invention have been described in detail with reference to the drawings, this is merely exemplary embodiments and the present invention can be implemented in variously modified or improved forms based on the knowledge of those skilled in the art.

For example, although the vehicle drive apparatus 10 includes the planetary gear device 26 and the first electric motor MG1 in the first and second embodiments, the vehicle drive apparatus 10 may be a drive apparatus of a so-called parallel hybrid vehicle having the engine 24, a clutch, the second electric motor MG2, the automatic transmission 22, and the drive wheels 18 coupled in series without including the first electric motor MG1 and the planetary gear device 26, for example. Since the clutch is disposed as needed between the engine 24 and the second electric motor MG2, the parallel hybrid vehicle may be configured without the clutch.

The vehicle drive apparatus 10 may not include the first electric motor MG1 and the planetary gear device 26 as described above; the engine 24 may not mechanically be coupled to the drive wheels 18; and, for example, the vehicle drive apparatus 10 may be a drive apparatus of a so-called series hybrid vehicle including the engine 24, an electric generator coupled to the engine 24, the second electric motor MG2 driven by electric power generated by the electric generator and coupled to the drive wheels 18, and the automatic transmission 22 making up a portion of a power transmission path between the second electric motor MG2 and the drive wheels 18.

Although the vehicle drive apparatus 10 of the first and second embodiments is a device for a hybrid vehicle, the vehicle drive apparatus 10 may be a drive apparatus for an electric vehicle using the second electric motor MG2 as a drive force source for running and having the second electric motor MG2, the automatic transmission 22, and the drive wheels 18 coupled in series without including the engine 24, the planetary gear device 26, and the first electric motor MG1.

Although the second electric motor MG2 outputs the creep torque Tcrp even when the accelerator opening degree Acc is zero during vehicle stop in the first and second embodiments, this is not essential and the second electric motor torque Tmg2 may be set to zero when the accelerator opening degree Acc is zero.

Although it is described in the first embodiment that the requested drive force Freq corresponds to the accelerator opening degree Acc, the requested drive force Freq may be determined by a parameter other than the accelerator opening degree Acc. For example, if an automatic speed control function is equipped that maintains the vehicle speed VL at a constant set vehicle speed without pressing down the accelerator pedal 27 and if the function is exercised, it can be said that a target value of the vehicle drive force Fc set by the function is the requested drive force Freq.

Although the necessary start-up drive force F0 is estimated by using the equations (1) to (4) in the first embodiment, this is an example and another method may be used for the estimation or calculation. For example, a map etc., may be set in advance that use all or a portion of the physical values used in the equations (1) to (4) as parameters for obtaining the necessary start-up drive force F0 and the necessary start-up drive force F0 may be estimated by using the map.

Although SA2 is included in FIG. 9 of the first embodiment, SA2 is not essential and, for example, a flowchart having SA3 executed next to SA1 without SA2 may be available.

Although the vehicle speed VL is zero during stop of the vehicle 8 in the first and second embodiments, the vehicle speed VL equal to or less than the start-up success judgment vehicle speed VLsrt may be included in the interpretation of "during stop of the vehicle 8" when the electric motor torque suppression control is provided or when the requested drive force judgment value Flreq is set.

Although the electric motor torque suppression control means 98 provides the electric motor torque suppression control on the condition that the start-up mode switchover determining means 212 determines that the start-up mode is selected in the second embodiment, the condition is not essential and, for example, the electric motor torque suppression control may be provided regardless of whether the start-up mode is selected. In this case, the start-up mode switchover determining means 212 is unnecessary.

Although the requested drive force Freq is compared with the requested drive force judgment value Flreq at SA3 in the flowchart of FIG. 9 of the first embodiment, since the necessary start-up drive force F0 (the start-up running resistance Rr0) estimated at SA1 is directly set as the requested drive force judgment value Flreq, a determination may be made at SA3 on whether the requested drive force Freq is greater than the estimated necessary start-up drive force F0 without the setting operation of the requested drive force judgment value Flreq. The same applies to the flowchart of FIG. 12 of the second embodiment and a determination may be made at SB2 on whether the requested drive force Freq is greater than the pre-slipping maximum drive force Fslp without the setting operation of the requested drive force judgment value Flreq at SB1.

Although the electric motor torque suppression control is described on the assumption that the motor running mode is used at start-up of the vehicle 8 in the first and second embodiments, the present invention does not exclude that the drive wheels 18 are driven by the engine 24 in conjunction with the second electric motor MG2.

Although the description of the setting of the requested drive force judgment value Flreq is made by taking the case of providing the electric motor heat generation limiting control at the time of the first pressing-down of the accelerator pedal as an example with reference to the time chart depicted in FIG. 11 in the second embodiment, the provision of the electric motor heat generation limiting control is not essential for setting the requested drive force judgment value Flreq.

Although the automatic transmission 22 is an automatic transmission capable of shift transmission of two speeds in the first and second embodiments, the number of speeds of the automatic transmission 22 is not limited to two and the automatic transmission 22 capable of shift transmission of three or more speeds may be available. The automatic transmission 22 is not essential and, for example, the vehicle drive apparatus 10 may be configured such that the second electric motor MG2 is coupled to the output shaft 14 without including the automatic transmission 22.

A plurality of the embodiments can be implemented in combination with each other, for example, in a prioritized manner. For example, the first and second embodiments may be combined in terms of the setting of the requested drive force judgment value Flreq to set the requested drive force judgment value Flreq as described in the first embodiment if the accelerator opening degree Acc is never increased during stop of the vehicle 8 and to set the requested drive force judgment value Flreq as described in the second embodiment if the vehicle is still stopped after the accelerator opening degree Acc is once increased and decreased.

Although not exemplary illustrated one by one, the present invention is implemented with various modifications applied without departing from the spirit thereof.

DESCRIPTION OF REFERENCE NUMERALS

8: vehicle
10: vehicle drive apparatus
18: drive wheels
28: electronic control device (control device)
MG2: second electric motor (electric motor)

The invention claimed is:

1. A control device of a vehicle drive apparatus in a vehicle including an electric motor for driving drive wheels, the control device controlling an output torque of the electric motor in accordance with a predetermined electric motor torque control characteristic making the output torque of the electric motor larger when a requested drive force is greater such that a drive force of the vehicle becomes equal to the requested drive force requested by a driver, wherein when the stopped vehicle is started, if the requested drive force is equal to or less than a requested drive force judgment value set equal to or less than a necessary start-up drive force necessary for start-up of the vehicle, the control device provides electric motor torque suppression control suppressing the output torque of the electric motor below an output torque determined from the electric motor torque control characteristic.

2. The control device of a vehicle drive apparatus of claim 1, wherein
the electric motor torque suppression control is provided if the requested drive force is once increased and decreased and then increased again during vehicle stop, and wherein
if the vehicle is still stopped after the requested drive force is once increased and decreased during vehicle stop, the requested drive force judgment value is set in advance to a drive force equal to or less than a maximum value of a drive force of the vehicle when the drive wheels do not rotate during the increase and decrease of the requested drive force.

3. The control device of a vehicle drive apparatus of claim 2, wherein
if a temperature of the electric motor exceeds a predetermined upper limit temperature, the control device provides electric motor heat generation limiting control limiting the output torque of the electric motor equal to or less than a predetermined limit value, and wherein
if the drive wheels slip due to cancellation of the output torque limitation of the electric motor through the electric motor heat generation limiting control provided during the increase and decrease of the requested drive force, the requested drive force judgment value is set in advance to a drive force equal to or less than the drive force of the vehicle at the start of the output torque limitation of the electric motor through the electric motor heat generation limiting control.

4. The control device of a vehicle drive apparatus of clam 3, wherein
the electric motor torque suppression control is provided if a start-up mode selected at start-up of the vehicle is selected.

5. The control device of a vehicle drive apparatus of claim 4, wherein
in the electric motor torque suppression control, the output torque of the electric motor is suppressed to generate a creep torque when an accelerator opening degree is zero.

6. The control device of a vehicle drive apparatus of claim 3, wherein
in the electric motor torque suppression control, the output torque of the electric motor is suppressed to generate a creep torque when an accelerator opening degree is zero.

7. The control device of a vehicle drive apparatus of claim 3, wherein
if the output torque of the electric motor is suppressed through the electric motor torque suppression control, the output torque of the electric motor is set to zero.

8. The control device of a vehicle drive apparatus of claim 2, wherein
the electric motor torque suppression control is provided if a start-up mode selected at start-up of the vehicle is selected.

9. The control device of a vehicle drive apparatus of claim 8, wherein
in the electric motor torque suppression control, the output torque of the electric motor is suppressed to generate a creep torque when an accelerator opening degree is zero.

10. The control device of a vehicle drive apparatus of claim 2, wherein
in the electric motor torque suppression control, the control torque of the electric motor is suppressed to generate a creep torque when an accelerator opening degree is zero.

11. The control device of a vehicle drive apparatus of claim 2, wherein
if the output torque of the electric motor is suppressed through the electric motor torque suppression control, the output torque of the electric motor is set to zero.

12. The control device of a vehicle drive apparatus of claim 1, wherein
the electric motor torque suppression control is provided if a start-up mode selected at start-up of the vehicle is selected.

13. The control device of a vehicle drive apparatus of claim 12, wherein
in the electric motor torque suppression control, the output torque of the electric motor is suppressed to generate a creep torque when an accelerator opening degree is zero.

14. The control device of a vehicle drive apparatus of claim 12, wherein
if the output torque of the electric motor is suppressed through the electric motor torque suppression control, the output torque of the electric motor is set to zero.

15. The control device of a vehicle drive apparatus of claim 1, wherein
in the electric motor torque suppression control, the output torque of the electric motor is suppressed to generate a creep torque when an accelerator opening degree is zero.

16. The control device of a vehicle drive apparatus of claim 1, wherein
if the output torque of the electric motor is suppressed through the electric motor torque suppression control, the output torque of the electric motor is set to zero.

17. The control device of a vehicle drive apparatus of claim 1, wherein
the necessary start-up drive force is estimated based on a running state before stop of the vehicle, and wherein
the requested drive force judgment value is set in advance to the estimated necessary start-up drive force.

18. A control device of a vehicle drive apparatus in a vehicle including an electric motor for driving drive wheels, the control device controlling an output torque of the electric motor in accordance with a predetermined electric motor torque control characteristic making the output torque of the electric motor larger when a requested drive force is greater such that a drive force of the vehicle becomes equal to the requested drive force requested by a driver, wherein
when the stopped vehicle is started, if the requested drive force exceeds a requested drive force judgment value set equal to or less than a necessary start-up drive force necessary for start-up of the vehicle, the control device controls the output torque of the electric motor in accordance with the electric motor torque control characteristic.

19. The control device of a vehicle drive apparatus of claim 18, wherein
the requested drive force judgment value is set to be larger than when the necessary start-up drive force is greater.

* * * * *